United States Patent [19]

Michaels et al.

[11] Patent Number: 5,390,122
[45] Date of Patent: Feb. 14, 1995

[54] METHOD AND APPARATUS FOR CALIBRATING A VEHICLE COMPASS SYSTEM

[75] Inventors: Paul A. Michaels, Livonia; Joseph F. Supinsky, Mt. Clemens; Robert F. Spitz, Rochester Hills, all of Mich.

[73] Assignee: Lectron Products, Inc., Rochester Hills, Mich.

[21] Appl. No.: 58,956

[22] Filed: May 7, 1993

[51] Int. Cl.⁶ .................. G01C 17/38; G01C 25/00
[52] U.S. Cl. .................. 364/443; 364/571.01; 364/571.05; 33/356; 73/1 E
[58] Field of Search ............ 364/571.01, 571.02, 364/571.05, 443, 457; 73/1 E; 33/355 R, 356, 357

[56] References Cited

U.S. PATENT DOCUMENTS

| | | | |
|---|---|---|---|
| 3,991,361 | 11/1976 | Mattern et al. | 33/356 |
| 4,031,630 | 6/1977 | Fowler | 364/571.02 |
| 4,546,551 | 10/1985 | Franks | 33/356 |
| 4,660,161 | 4/1987 | Okada | 364/457 |
| 4,807,462 | 2/1989 | Al-Attar | 73/1 E |
| 4,843,865 | 7/1989 | Fowler | 73/1 E |
| 4,953,305 | 9/1990 | Van Lente et al. | 33/356 |
| 5,046,031 | 9/1991 | Wanous | 364/571.02 |
| 5,090,231 | 2/1992 | Gallagher | 364/571.05 |
| 5,161,311 | 10/1992 | Esmer et al. | 33/356 |
| 5,187,872 | 2/1993 | Dufour | 364/571.04 |
| 5,287,295 | 2/1994 | Ives et al. | 364/457 |

Primary Examiner—Kevin J. Teska
Assistant Examiner—Tyrone V. Walker
Attorney, Agent, or Firm—Harness, Dickey & Pierce

[57] ABSTRACT

A vehicle compass system that is adapted to be calibrated in the assembly plant during final assembly of the vehicle. In particular, two factory calibration modes are disclosed: an automatic factory calibration mode wherein the calibration sequence is automatically initiated upon the occurrence of a uniquely definable event on the assembly line, and a manual factor calibration mode wherein a calibration button sequence is actuated at a specified location on the assembly line. In addition, an automatic adaptive calibration process is disclosed which continuously updates the calibration constants each time valid new heading data is obtained. In particular, heading vectors for the four main N, S, E, and W heading directions are calculated and stored in memory when the system is initially calibrated. Thereafter, whenever new heading direction data is obtained, the value of the new heading vector is used to update the value of the closest of the four main heading vectors. A new center calculation is also performed using the updated values and if the result is outside a tolerance window, the calibration constants are changed accordingly.

38 Claims, 14 Drawing Sheets

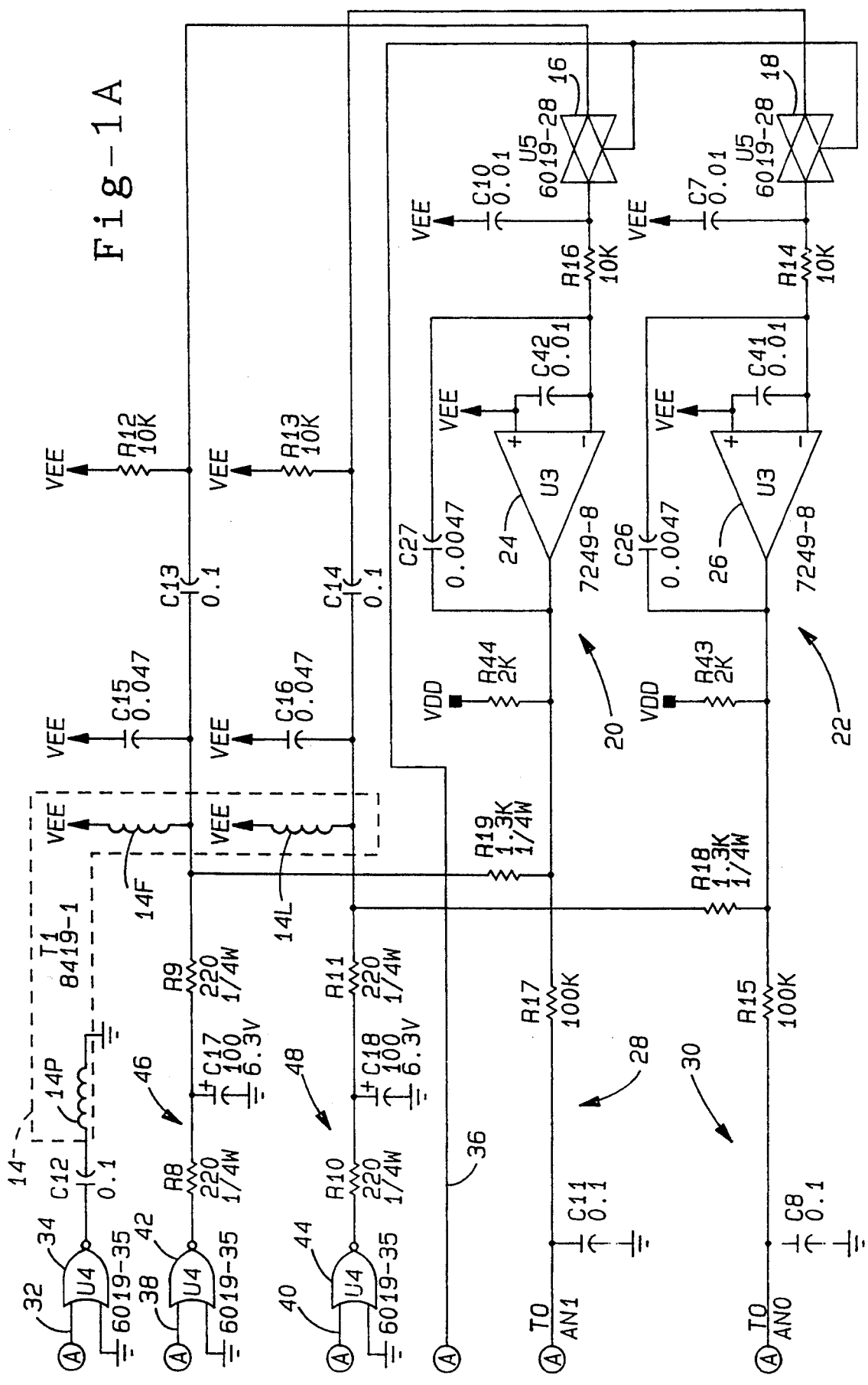

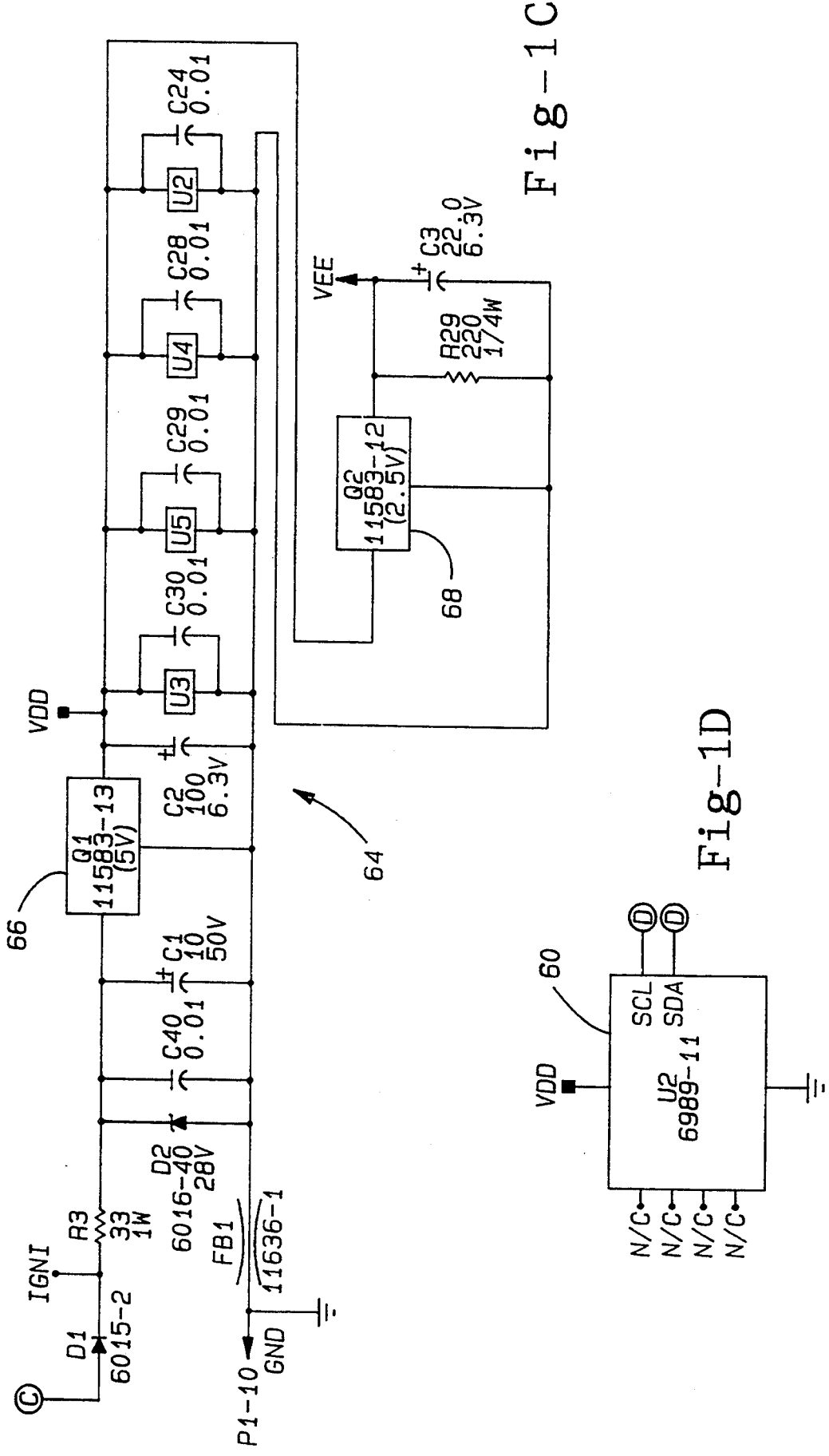

METHOD AND APPARATUS FOR CALIBRATING A VEHICLE COMPASS SYSTEM

BACKGROUND AND SUMMARY

The present invention relates to a vehicle compass and, in particular, to an improved method and apparatus for calibrating a vehicle compass.

Digital compasses for vehicles typically employ a magnetic sensor, such as a flux-gate sensor, that comprises two orthogonally disposed sensing coils. The sensor is mounted in the vehicle so that one of the sensing coils is oriented along the longitudinal axis of the vehicle and the other sensing coil is oriented transversely or laterally relative to the vehicle's axis. The heading direction of the vehicle is determined by analyzing the sensor's response from the two orthogonally disposed sensing coils and computing the resulting radius vector.

It has long been recognized that vehicles exhibit their own unique remnant magnetic fields which distort the output of a magnetic sensor. In addition, the metal body structure of a vehicle also distorts the earth's magnetic field in the vicinity of the compass sensor. Accordingly, in order to obtain a true indication of vehicle direction, it is necessary to compensate for these effects. Numerous compass calibration routines have been proposed for accomplishing this objective.

One known approach requires that the operator initiate a calibration routine and orient the vehicle in the due north (or south) direction and depress a calibration button. The compass electronics then automatically calculate the appropriate offset signal to be supplied to the E-W sensor coil to cause the sensor output to read due north (or south). The vehicle is then reorientated by the operator in the due east (or west) direction and the calibration button again depressed. The compass electronics then automatically calculate the appropriate offset signal to be supplied to the N-S sensor coil to cause the sensor output to read due east (or west). A calibration process of this type is described in U.S. Pat. No. 4,546,551, to Franks.

A second known calibration technique requires that the operator drive the vehicle in one or more circles while the compass electronics analyze the sensor outputs from both orthogonal sensing coils. The values of the vehicle's remnant magnetic field in the two sensor directions simply comprises the algebraic average of the sensor's responses for a defined number of complete circles. Alternatively, the vehicle's remnant magnetic field comprises the algebraic average of the maximum and minimum peak responses from the two sensor coils. In addition, the sensor's sensitivity coefficients are proportional to the sum of the absolute values of the maximum and minimum peak responses. Consequently, with this data appropriate compensation signals can be produced and supplied to the sensor coils to correct for the vehicle's effect on the sensed magnetic field and enable an accurate reading of vehicle heading. A calibration technique of this type is disclosed in U.S. Pat. No. 3,991,361, to Mattern et al.

While the known calibration techniques are effective, they suffer the disadvantage of being time consuming and requiring dedicated labor to implement and therefore are costly to the manufacturer of the vehicle. In particular, the first described process typically requires that each vehicle be driven off the assembly line to a designated location near the factory that is free of magnetic disturbances and then successively oriented in the two predetermined directions as the operator sequences through the various steps of the calibration process. Not only is this process time consuming, but the accuracy of the calibration is dependent upon the accuracy with which the operator points the vehicle.

The second described process also typically requires that each vehicle be driven off the assembly line to a designated location that is relatively flat and free of external magnetic disturbances. The operator then actuates a button or a predetermined button sequence and the vehicle is slowly driven in a circle until the compass system determines it has sufficient valid data to make the appropriate compensation. While simpler than the first process, this calibration process is also time consuming and is labor intensive as it requires the services of one or more non-production employees to calibrate the vehicles as they leave the assembly line.

Notwithstanding initial calibration, existing compass systems typically require periodic recalibration to correct for variations and changes in the vehicle's magnetic field as well as in the vehicle's distortion of the earth's magnetic field. Consequently, it has additionally been proposed to provide automatic adaptive calibration of the compass system during normal operation of the vehicle in an effort to reduce the periodic need to manually recalibrate the system. One existing automatic calibration process continuously monitors the vehicle's direction heading and detects when the vehicle has been driven through a complete 360° excursion. The maximum and minimum peak responses of the sensing coils are then stored and averaged with a number of preexisting sets of data from previous 360° excursions and the results used to adjust the compensation signals supplied to the sensing coils. Consequently, depending on the manner in which a particular vehicle is driven, the calibration data of the system may change as frequently as daily or as infrequently as monthly. Obviously, the more infrequent the calibration data is updated, the less effective the automatic calibration routine is in accurately compensating for changes in the magnetic characteristics of the vehicle. A vehicle compass system having automatic calibration of this type is described in U.S. Pat. No. 4,953,305 to Van Lente et al.

Accordingly, it is the primary object of the present invention to provide an improved vehicle compass system that overcomes the above-described disadvantages of existing vehicle compass systems. In particular, it is an object of the present invention to provide a vehicle compass system that can be initially calibrated on the assembly line at the vehicle manufacturing facility. In addition, it is an object of the present invention to provide a vehicle compass system that is capable of performing this initial factory calibration process automatically during final assembly of the vehicle.

It is a further object of the present invention to provide an improved vehicle compass system that incorporates an automatic calibration routine that continuously updates the calibration coefficients of the sensor each time a valid reading is taken so that compensation data is updated on a much more frequent basis.

The vehicle compass system according to the present invention contains two alternative factory calibration schemes: a manual calibration version and an automatic calibration version. For the manual calibration method, a designated location along the final portion of the assembly line where the magnetic environment is known and stable is preselected and the magnetic characteristics of the location stored in the non-volatile memory of the compass. When the vehicle reaches the designated location on the line, an operator initiates a predetermined button sequence on the compass display to place the compass in the manual factory calibration mode. Thereupon, the compass measures the magnetic fields for the forward and lateral directions and compares the measured values with the pre-stored values in its non-volatile memory. If the measured field values differ from the stored field data, a current is passed through the appropriate sense winding in the proper direction to offset the discrepant magnetic field until the measured value corresponds with the stored field data. The resulting compensation coefficients are then stored in the compass's non-volatile memory and the calibration process is complete.

Alternatively, it will be recognized that if the dynamic range of the measurement system is large enough, calibration of the system need not be performed by implementing a hardware correction, but may instead be performed with software by simply remembering the observed offset and using it to make subsequent software corrections to the measured field readings.

The automatic factory calibration process is similar to the manual factory calibration process except for the procedure used to initiate the calibration routine. Rather than requiring the actuation of a preselected button sequence, the automatic factory calibration process identifies a unique assembly line operation and uses the occurrence of this event to automatically initiate the factory calibration routine. In the preferred embodiment, the proposed event is the point during final assembly of the vehicle when the vehicle's ignition is first turned on and the transmission engaged as part of the engine and drive train test. The microcomputer in the compass is programmed to identify this event and automatically initiate the factory calibration process without operator intervention. The magnetic characteristics of this location in the assembly plant are pre-stored in the non-volatile memory of the compass and the calibration process proceeds in the same manner as that described for the manual factory calibration process. Since the magnetic signature of this location where the automatic calibration process is performed is unique, the automatic calibration process is enabled only once and then locked out so that the automatic calibration routine cannot be inadvertently re-enabled after the vehicle leaves the factory. In addition, the automatic factory calibration is preferably locked out if the manual factory calibration process is performed. Moreover, the entire factory calibration routine is preferably locked out after the vehicle has been driven at speeds greater than a preselected value for a specified number of times.

The present vehicle compass system also includes a unique adaptive calibration routine that automatically updates the data used to calculate the compensation coefficients each time a valid reading is taken. In the preferred embodiment, this occurs approximately every 30 milliseconds. Consequently, the likelihood of the present compass system drifting out of calibration are greatly reduced. The present compass system performs this continuous automatic calibration process in the following manner. Each time new valid data is obtained, the appropriate heading vector is calculated. The calculated heading vector is then compared to the closest north, south, east, or west corrected radius vector and the difference used in a weighted average formula to update the value of the corrected radius vector. In addition, a new center calculation is also performed using a similar weighted average formula and the values of the compensation coefficients updated accordingly if the center excursion is outside predetermined acceptable limits.

Lastly, an improved technique is used to make the threshold determination of whether the newly received data samples represent valid data based upon the speed of the vehicle and the observed rate of change in the data sample values. In this manner, the compass display more closely tracks the changes in vehicle direction, particularly during low speed maneuvers where the direction heading can change relatively rapidly.

Additional objects and advantages of the present invention will become apparent from a detailed reading of the following description of the preferred embodiment which makes reference to the drawings of which:

BRIEF DESCRIPTION OF THE DRAWINGS

FIG. 1, 1a–1d are circuit diagrams of the vehicle compass system according to the present invention;

DETAILED DESCRIPTION OF THE PREFERRED EMBODIMENT

Figure 1:
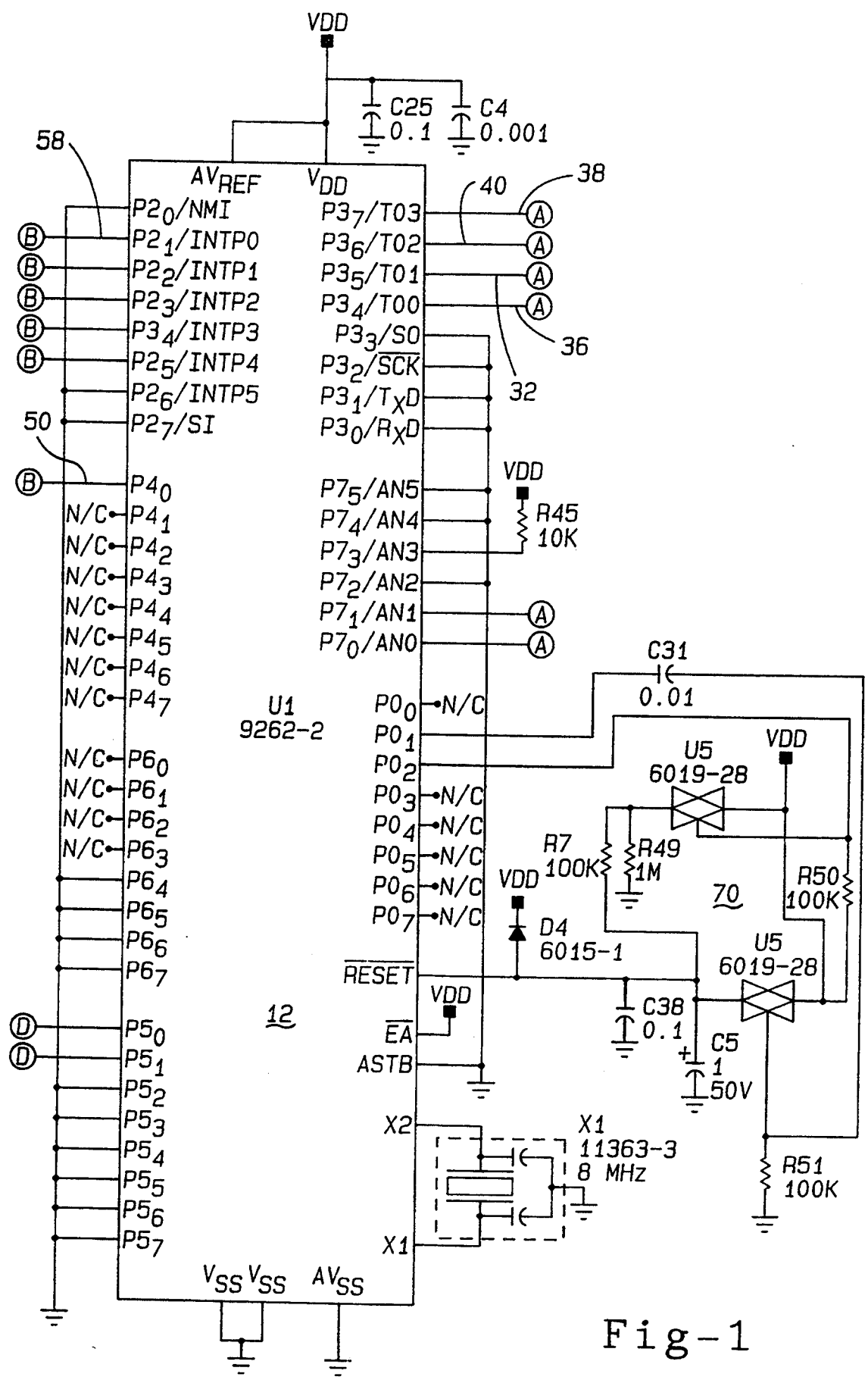
Figure 1B:
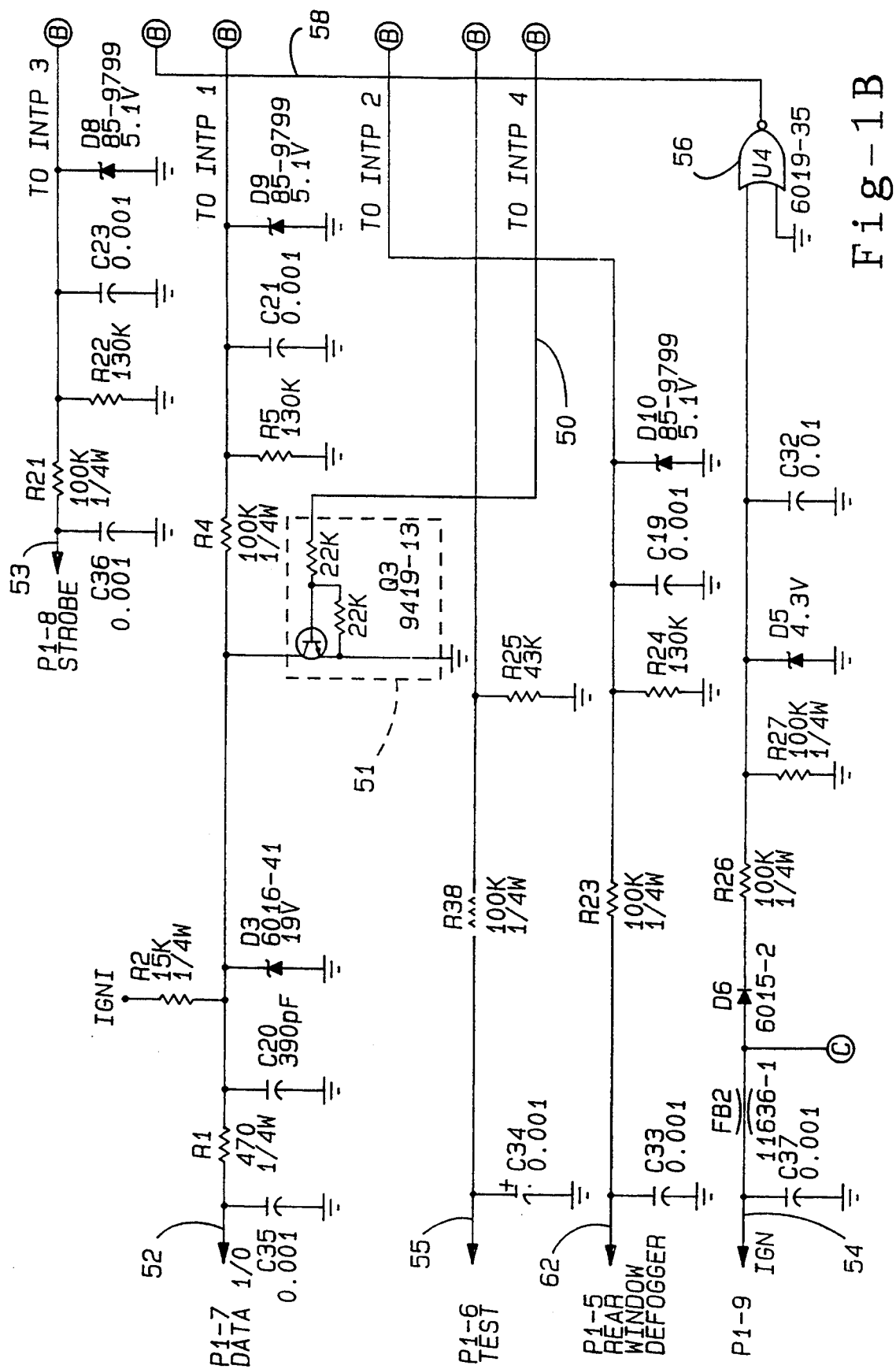

Referring to FIG. 1, a circuit diagram of a vehicle compass system according to the present invention is shown. The vehicle compass comprises a microcomputer 12 that controls the exitation of a flux-gate sensor 14, periodically samples the processed output signals from the flux-gate sensor, calculates the heading direction of the vehicle, and generates an appropriate display heading output signal that is provided to a digital display (not shown). The flux-gate sensor 14 comprises a primary winding 14P and two secondary sense windings 14F and 14L. The flux-gate sensor 14 in the preferred embodiment is mounted underneath the rear package shelf of the vehicle so that one of the secondary sense windings 14F is aligned with the longitudinal axis of the vehicle and the other sense winding 14L is oriented orthogonally relative to the first sense winding 14F so that it is disposed laterally relative to the axis of the vehicle. The outputs from the secondary sense windings 14F and 14L are connected through analog switches, 16 and 18 respectively, to a pair of integrator circuits 20 and 22, which include amplifiers 24 and 26, respectively. The analog switches 16 and 18 control the sampling period of the output signals from the sense winding 14F and 14L and the integrator circuits 20 and 22 convert the pulse signals from the sense windings to corresponding analog output signals with low ripple. The analog output signals from the integrator circuits 20 and 22 are then provided through low pass filter circuits 28 and 30 to the analog-to-digital (A/D) input ports AN0 and AN1 of the microcomputer 12.

Figure 2:
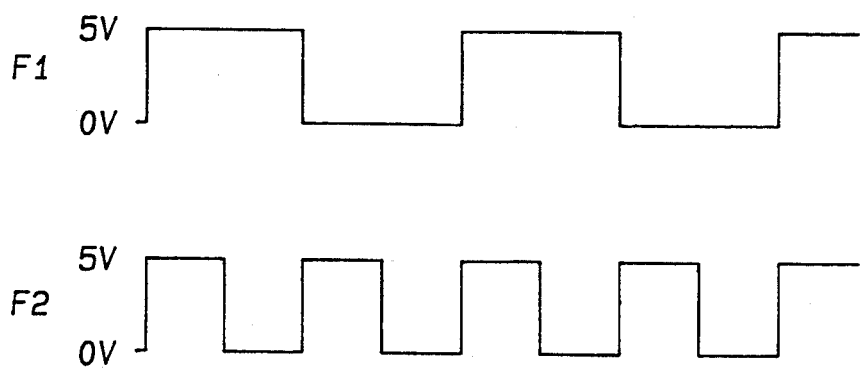
FIG. 2 is a timing diagram illustrating the relationship between the F1 drive signal supplied to the primary winding of the sensor and the F2 sampling signal supplied to analog switches.

A square wave drive signal (F1) having a frequency of 6.25 kHz is supplied by the microcomputer 12 on output line 32 to the primary winding 14P of the flux-gate sensor 14 through a high current driver logic NOR-gate 34. The square wave drive signal (F1) is adapted to saturate the core of the flux-gate sensor so as to induce an output signal in the sense windings 14F and 14L of the flux-gate sensor. In order to properly synchronize the sampling of the output signals from the sense windings 14F and 14L with the saturation of the primary winding 14P, the microcomputer 12 also produces a second square wave output signal (F2) on line 36 in phase with and at twice the frequency of the F1 drive signal produced on line 32. The F2 synchronous sampling signal is supplied to the gates of analog switches 16 and 18 and controls the conductive states of analog switches 16 and 18. A timing diagram illustrating the waveforms of the F1 and F2 signals is illustrated in FIG. 2.

In order to compensate for the remnant magnetic field of the vehicle as well as the distortion of the earth's magnetic field caused by the metal in the body of the vehicle, the microcomputer 12 produces compensation signals (NFC and NLC) on output lines 38 and 40 which are supplied to the forward and lateral sense windings 14F and 14L through logic NOR-gates 42 and 44 and low pass filter circuits 46 and 48. The compensation signals produced by the microcomputer 12 on lines 38 and 40 comprise pulse-width modulated signals, the duty cycles of which are proportional to the magnitude of the analog signals supplied to the sense windings 14F and 14L. The values and phases of the compensation signals produced by the microcomputer 12 on lines 38 and 40 are appropriate to offset the magnetic distortion created by the vehicle so that the output from the flux-gate sensor is properly calibrated to the earth's magnetic field. The manner in which the microcomputer 12 is programmed to correctly calibrate the compass system is explained in greater detail below.

Importantly, it will be appreciated that while the preferred embodiment of the present vehicle compass system is described as being calibrated by implementing a hardware correction (i.e., by producing compensation signals that are supplied to the sensing coils 14F and 14L), the present invention is equally applicable to a vehicle compass system that is calibrated exclusively through software. In other words, the production of compensation correction signals in the preferred embodiment is necessitated primarily by the limitations in the dynamic operating range of the measurement system and, in particular, the range and resolution of the 8-bit A/D converter in the microcomputer 12. If, however, the system included a 12-bit or 16-bit A/D converter, the dynamic operating range of the measurement system would be sufficient to permit the calibration to be implemented by simply programming the microcomputer 12 to remember the measured offset observed during the calibration process and thereafter make appropriate software corrections to the measured field readings using the stored offset value. With such a system, the need for producing compensation signals, and the attendant circuitry required therefor, would be eliminated. At the present time, the described hardware implementation approach is preferred primarily on the basis of cost.

The calculated heading data is produced by the microcomputer 12 on output line 50 from the serial data output port $P4_0$ and is supplied to the digital display via an inverter circuit 51 to the DATA I/O line 52 connected to the digital display. Various interrupt inputs are provided to the microcomputer 12 to enable the microcomputer 12 to monitor various predetermined vehicle parameters and to interface with the operator via the display. In particular, the STROBE line 53 from the digital display synchronizes the microcomputer 12 to the display, supplies the manual calibration initiation input signals, and also supplies the vehicle speed data to the microcomputer. Input line 55 is a TEST line for initiating a test routine to check the proper functioning of the compass. IGNITION line 54 is connected to the microcomputer 12 through a logic NOR-gate 56 via line 58 so that the microcomputer can detect when the ignition of the vehicle has been turned off. In particular, on power down, the microcomputer 12 is programmed to store the last heading data and calibration constants in non-volatile RAM within the microcomputer 12. Finally, an input line from the rear window defogger 62 is connected to an interrupt port to signal the microcomputer 12 when the rear window defogger has been activated which changes the magnetic characteristics of the vehicle and thus necessitates changing the compensation coefficients supplied to the flux-gate sensor on output lines 38 and 40.

Various programmed data, including the data necessary to implement the factory and manual calibration schemes as well as the curve for identifying valid data (to be described later), are stored in a nonvolatile memory 60, which in the preferred embodiment comprises an EEPROM.

Finally, a watchdog timer circuit 70 is provided which supplies a periodic pulse to the microcomputer 12 to ensure that the computer does not become inadvertently "hung up" in a software loop. A regulated DC power supply circuit 64 is connected across the ignition 54 and ground lines and includes a 5-volt regulator circuit 66 for producing a regulated +5 volts DC signal (VDD) and a 2.5-volt regulator circuit 68 for producing a regulated 2.5-volt DC signal (VEE).

In general, the compass system functions in the following manner. Assuming that the system is properly calibrated (i.e., that appropriate compensation signals are provided on output lines 38 and 40 to the forward 14F and lateral 14L sensing coils of the flux-gate sensor), analog signals from the sensing coils 14F and 14L are supplied to the AN1 and AN0 analog inputs of the A-to-D converter in the microcomputer 12. The magnitude of the analog signals (hereinafter designated VDFAS and VDLAS) identify the vector heading of the vehicle. The microcomputer 12 then calculates, based upon the readings for VDFAS and VDLAS, the appropriate heading direction of the vehicle and produces an 8-bit serial output signal on line 50 indicative of the identified heading. In particular, the output signal on line 50 comprises an 8-bit count signal which identifies the heading angle of the vehicle relative to a north heading with a positive count toward the east direction. In other words, a zero count corresponds to a true north heading, a count of 64 corresponds to an east heading, a count of 128 corresponds to a south heading, and a count of 192 corresponds to a west heading. An internal direction buffer in the microcomputer 12 is updated each time valid direction heading data is obtained, or approximately every 30 milliseconds during normal vehicle operation. The output display of the compass requests new heading information approximately twice per second.

Figure 3:
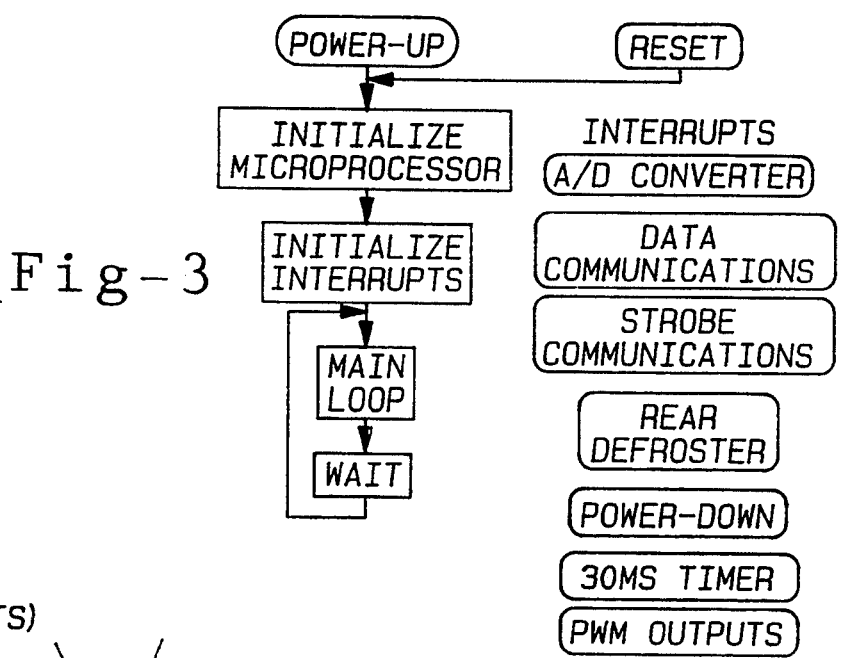
FIG. 3 is a flowchart of the software programmed into the microcomputer shown in FIG. 1.

Turning now to FIG. 3, a flowchart diagram of the software of the microcomputer 12 is shown. During the MAIN LOOP of the program, the microcomputer 12 samples the two input lines from the sensor coils 14F and 14L, calculates a new heading direction, displays the new heading direction on the display, and then waits 30 milliseconds before repeating the process. The program interrupts are listed in FIG. 3. The A-to-D converter interrupt performs the conversion of the analog input signals from the sensing coils to digital data. The data communications and strobe communications interrupts are used when communicating with the digital display. The rear window defroster interrupt, as previously noted, is implemented when the rear window defroster has been turned on, thereby necessitating a change in the compensation coefficients. The power down interrupt is used when the ignition is turned off to cause the microcomputer to store the last heading data and calibration constants. The 30-millisecond timer interrupt is implemented, as previously explained, during each pass through the main loop of the program. Lastly, the PWM outputs interrupt is implemented when generating the compensation signals on lines 38 and 40 to the sensing coils of the flux-gate sensor 14.

Figure 4:
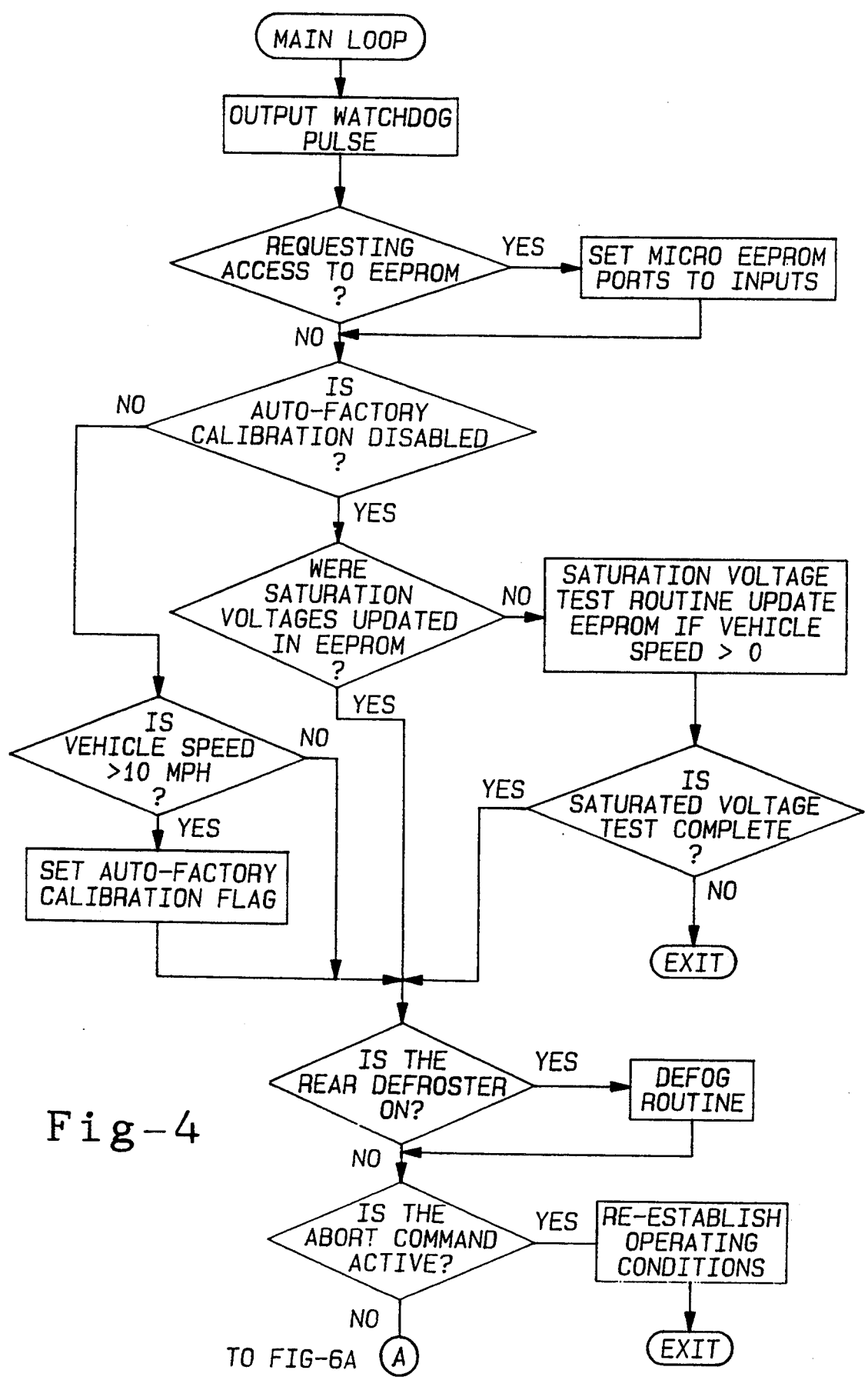
FIG. 4, 4a are flowcharts of the MAIN LOOP of the program shown in FIG. 3.
Figure 4A:
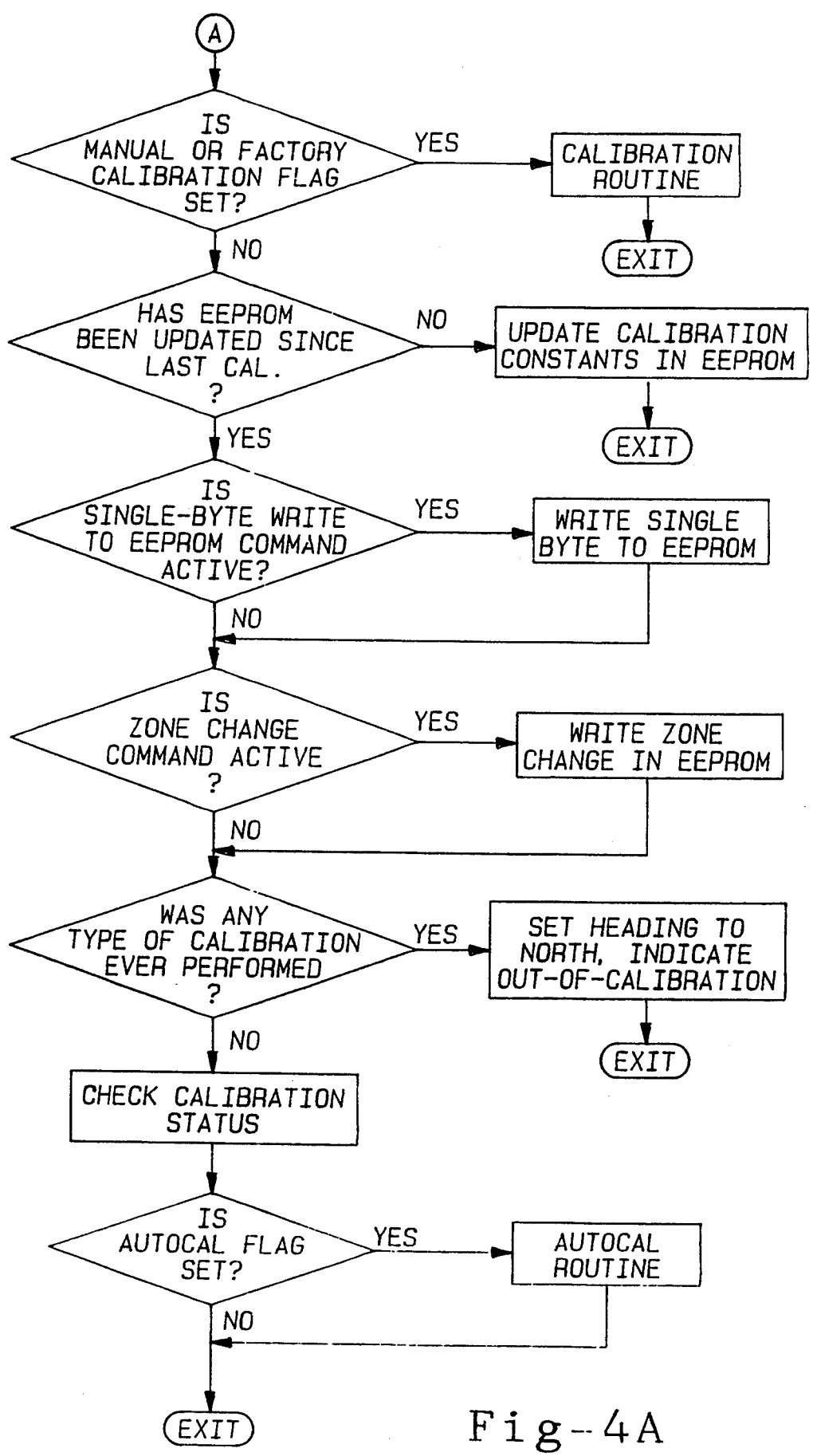

Referring to FIG. 4, the flowchart of the MAIN LOOP of the program is shown. Assuming that the system is properly calibrated and operating in its normal mode, the program waits for the receipt of new data, as signalled by the receipt of the A/D CONVERTER interrupt, and then branches to the VALID DATA subroutine. The VALID DATA subroutine ensures that the data received by the microcomputer 12 from the sensing coils 14F and 14L is non-erroneous data and therefore properly included in the sample data calculations performed by the microcomputer to determine the heading of the vehicle. For example, when the vehicle passes under a bridge, the outputs from the sensing coils may vary dramatically and thus cause a distortion in the reading of the compass. Accordingly, in order to avoid an erroneous response to such data, the input signals from the sensing coils 14F and 14L are continuously evaluated and compared to previous sampled data to determine if the rate of change in the sampled data has exceeded predetermined limits, given the current speed of the vehicle.

Figure 5:
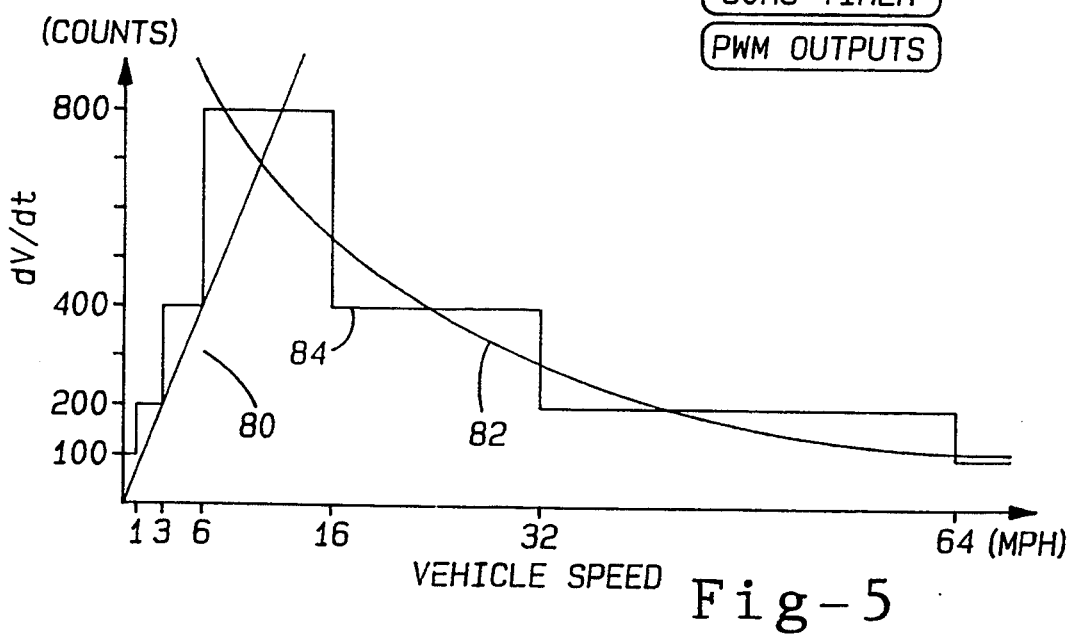
FIG. 5 is a graph illustrating the curve used to evaluate the validity of the sampled data readings.

With additional reference to FIG. 5, a graph plotting rate of change in the voltage signal from a sensing coil versus vehicle speed is shown. The first curve, designated 80 in the drawing, corresponds to the observed rate of change in the voltage signal from the sensing coil at relatively low vehicle speeds, wherein the slope of the line is equal to 1/R where R is the radius of the turn. In the preferred embodiment, R is selected to be 20 feet which is somewhat greater than the minimum turning radius of a vehicle and representative of the tightest turn that a vehicle will typically perform during normal operation. The second curve, designated 82 in the drawing, corresponds to the observed rate of change in the voltage signal from a sensing coil versus vehicle speed for a 0.5 g turn. The second curve 82 is essentially equivalent to the equation $dV/dt = (1/\text{veh. spd.}) + n$, where n is a DC offset for noise. Turns taken at greater g forces will obviously produce steeper curves while turns taken at more gradual g forces will produce more gradual curves. The 0.5 g curve is selected in the preferred embodiment as being representative of the most aggressive maneuver typically implemented during normal driving, such as when entering an on-ramp to a freeway. The present compass system proceeds on the premise that all received data that falls beneath these two curves 80 and 82 comprise "valid" data, and all received data that lies above the curves comprise "bad" data. The digital approximation 84 of these two curves is stored in the nonvolatile memory 60 of the compass.

Figure 6:
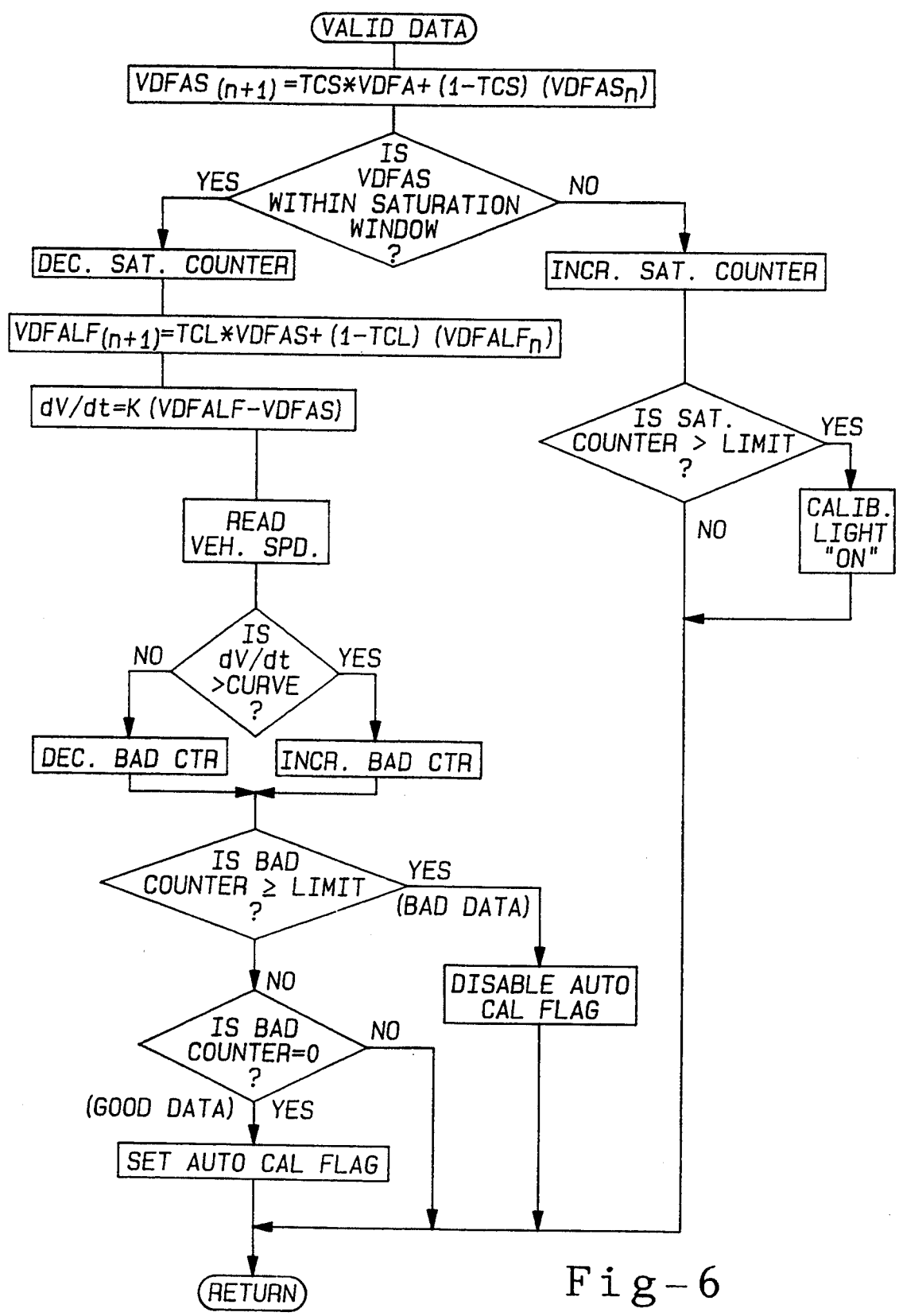
FIG. 6 is a flowchart of the VALID DATA routine.

Referring to FIG. 6, a flowchart diagram of the VALID DATA routine is shown. For the convenience of the reader, a table setting forth the definitions of the various abbreviated designations used through the flowchart diagrams is set forth at the end of the specification. Initially, it should be noted that the A/D converter in the microcomputer 12 performs the A/D conversion process by taking the average of 16 sample readings. The result is referred to as "VDFA" (or "VDLA"). A new VDFA/VDLA reading is provided at the output of the A/D converter approximately every 1.3-1.6 milliseconds. With each new VDFA reading, the computer is programmed to calculate a new value for VDFAS using a time-weighted average calculation as shown, wherein TCS is equal to a relatively short time constant such as 0.1. The program then determines whether or not the new value for VDFAS is within the saturation limits of the integration amplifiers 24 and 26. The maximum and minimum saturation limits of the two amplifiers are preprogrammed into the nonvolatile EEPROM memory units 60 of the compass. If the value of VDFAS is outside the "saturation window", a saturation counter is incremented. On the other hand, if the value of VDFAS is within the saturation window, the saturation counter is decremented. If the count in the saturation counter exceeds a predetermined limit, indicating that the compass is out of calibration, then the calibration light on the display is illuminated advising the operator that the compass needs to be manually recalibrated. However, by providing a saturation counter as described, the present compass system accommodates temporary excursions outside the saturation limits of the amplifier circuitry without requiring manual recalibration of the compass.

Proceeding with the VALID DATA routine, the microcomputer is next programmed to determine the rate of change in the value of VDFAS by initially calculating a long filtered value for VDFA using the same time-weighted average formula described above, wherein the time constant TCL is equal to a relatively long time constant, and then taking the difference between the calculated values for VDFALF and VDFAS. The computer then obtains the current vehicle speed reading from the display and, referring to the previously described "VALID DATA" curve stored in the nonvolatile memory 60, determines whether or not the present value for dV/dt is above or below the curve. If the present rate of voltage change is above the curve, given the current speed of the vehicle, then the data is presumed to be "bad" and a "bad counter" is incremented. On the other hand, if the value of dV/dt, given the speed of the vehicle, is below the curve, the "bad counter" is decremented. If the content of the bad counter exceeds a predetermined limit, then the incoming data is presumed to be erroneous and the AUTOCAL flag is disabled. On the other hand, if the bad data counter is equal to zero, the present data is presumed to be "good" and the AUTOCAL flag is set and the computer 12 returns to the MAIN LOOP. Consequently, it will be appreciated that if there is an excursion in the value of dV/dt above the "valid data" curve, the system will wait for the data to digress back below the curve before treating the input as valid data. In the preferred embodiment, the "bad counter" is incremented by three each time there is an excursion above the curve and decremented by only one whenever the value is below the curve. In this manner, the value of dV/dt must return below the curve and remain below the curve approximately three times as long as the period during which the excursion was above the curve before the system accepts the incoming data as valid. In this manner, the system is assured of accepting and responding to only good data.

In addition, it will be noted from FIG. 5 that by accepting as "good data" relatively high values for dV/dt at low vehicle speeds, the present compass system is able to more accurately track and quickly respond to changes in vehicle heading at slow vehicle speeds, such as when turning corners. The above-described calculations for the incoming voltage signal from the forward sensing coil are, of course, also calculated and performed on the incoming voltage signal from the lateral sensing coil 14L as well.

As will subsequently be explained in greater detail, once it has been determined that valid new data has been received, the AUTOCAL flag is set, and during the next pass through the MAIN LOOP the program jumps to the AUTOCAL routine. During the AUTOCAL routine, a new heading reading is determined based upon the new values for VDFAS and VDLAS obtained from the VALID DATA routine. The appropriate vehicle heading is then calculated and stored in the internal direction buffer. When the output display requests a new heading direction, the direction data in the buffer is transferred to the output display and used to update the display.

Figure 7:
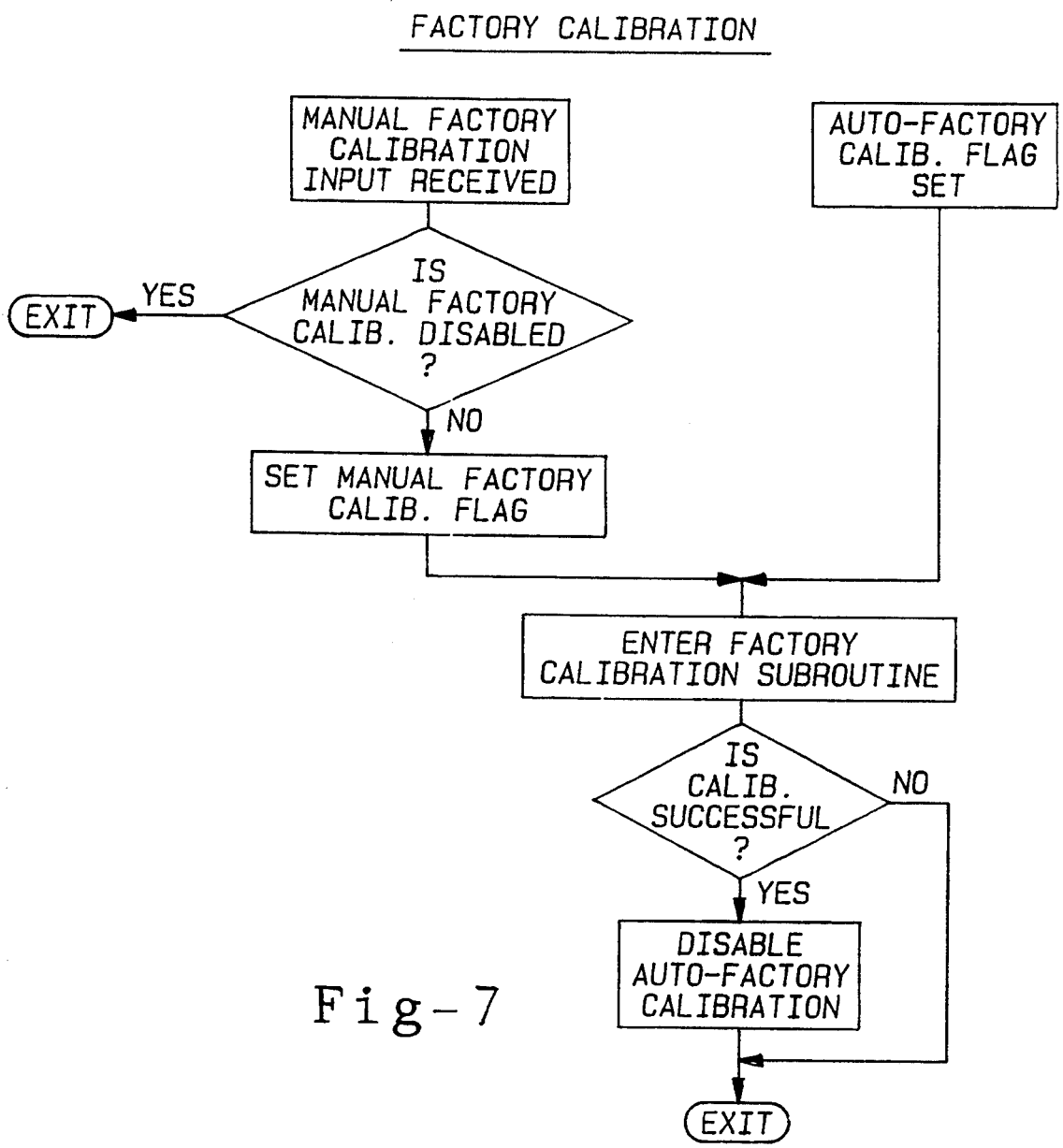
FIG. 7 is a flowchart of the FACTORY CALIBRATION routine according to the present invention.
Figure 8:
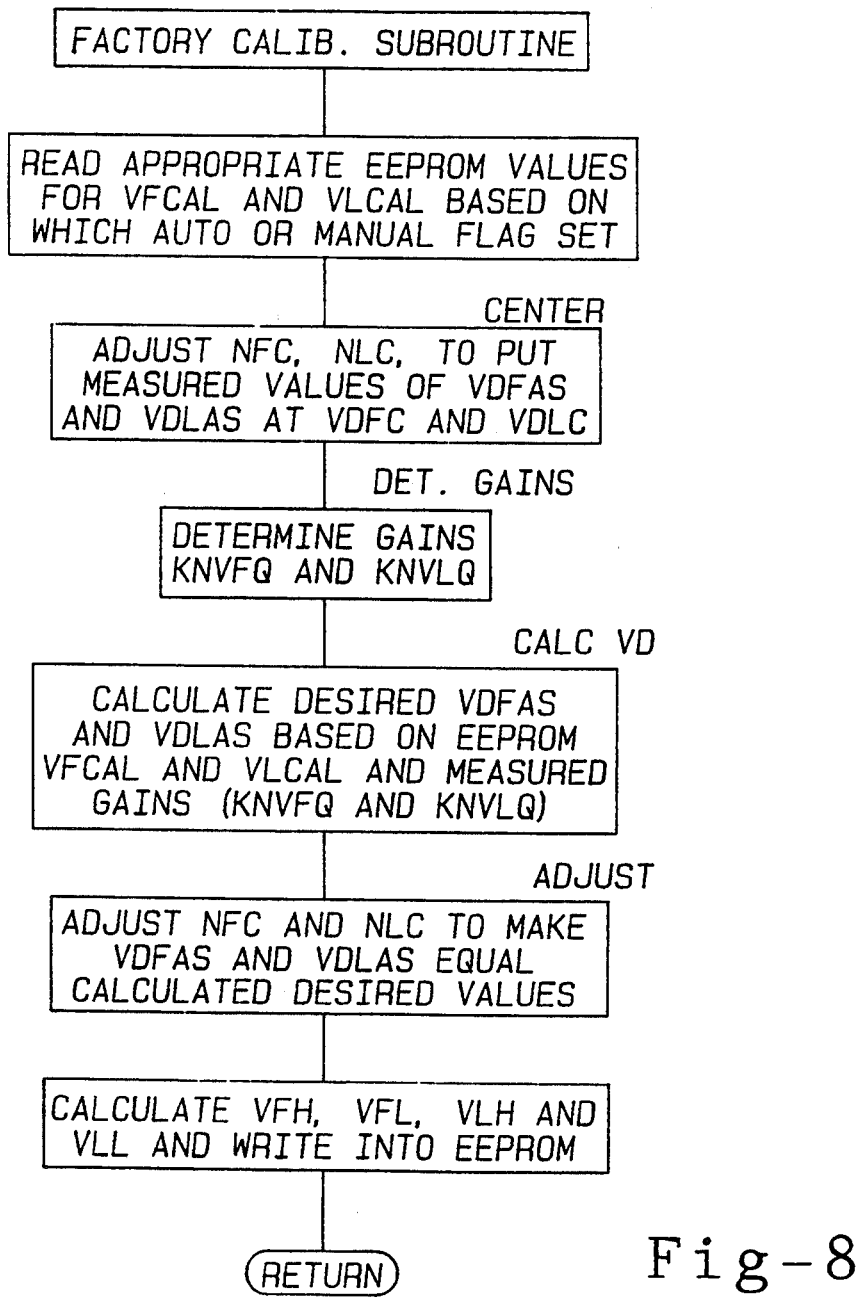
FIG. 8 is a flowchart diagram of the FACTORY CALIBRATION subroutine referred to in FIG. 7.

Turning now to FIGS. 7 and 8, the manner in which the present compass system is initially calculated at the factory will now be explained. The present invention provides two modes of implementing factory calibration. The first mode, designated "auto factory" calibration, is performed in the preferred embodiment upon the initial start-up and drive train test for the vehicle which takes place on the assembly line during final assembly of the vehicle. Other suitable, uniquely definable events which take place during final vehicle assembly at magnetically stable locations on the assembly line can also be used. The desired values for VDFAS and VDLAS (designated VFCAL and VLCAL) corresponding to the magnetic heading direction that the compass system should read at this unique point on the assembly line are prestored in the compass's nonvolatile memory 60. During the initial startup and drive train test, the auto factory calibration routine is entered and the magnetic fields for the forward and lateral directions of the compass are measured. The measured magnetic fields are then compared with the prestored values from the compass's nonvolatile memory and appropriate compensation signals (NFC, NLC) produced and supplied to the forward and lateral sense windings of the compass to offset the discrepant magnetic field and force the measured values to agree with the stored field data. The resulting compensation coefficients are then stored in the compass's nonvolatile memory.

An alternative "manual factory" calibration mode is also provided. In this mode, an assembly line operator initiates a unique button sequence on the compass display when the vehicle is in a predetermined, magnetically stable location on the assembly line during final assembly of the vehicle. This location in the assembly plant has also been preselected and the magnetic field data for the location prestored in the compass's nonvolatile memory. When the manual factory calibration mode is entered as described, the compass will then measure the magnetic fields for the forward and lateral directions and compare the measured values with the prestored values from the nonvolatile memory. As with the auto factory calibration mode, if the measured field values do not agree with the stored field data, appropriate compensation signals (NFC, NLC) are produced and supplied to the sense windings of the compass to offset the discrepant magnetic field and force the measured values to agree with the stored field data. The resulting compensation values are then stored in the compass's nonvolatile memory.

The microcomputer 12 enters the factory calibration mode from the MAIN LOOP of the program. As shown in FIG. 3, following initial power-up of the compass, the program proceeds to the point where an inquiry is made as to whether the auto factory calibration mode has been disabled. If it has not, the microcomputer checks to see whether the vehicle speed has exceeded 10 mph, indicative of the initiation of the power train test. If the appropriate test condition is satisfied, the AUTO FACTORY CALIBRATION flag is set and the program thereafter jumps to the FACTORY CALIBRATION routine. When the FACTORY CALIBRATION routine is entered via setting of the AUTO FACTORY CALIBRATION flag, the program immediately proceeds to the FACTORY CALIBRATION subroutine.

Figure 9:
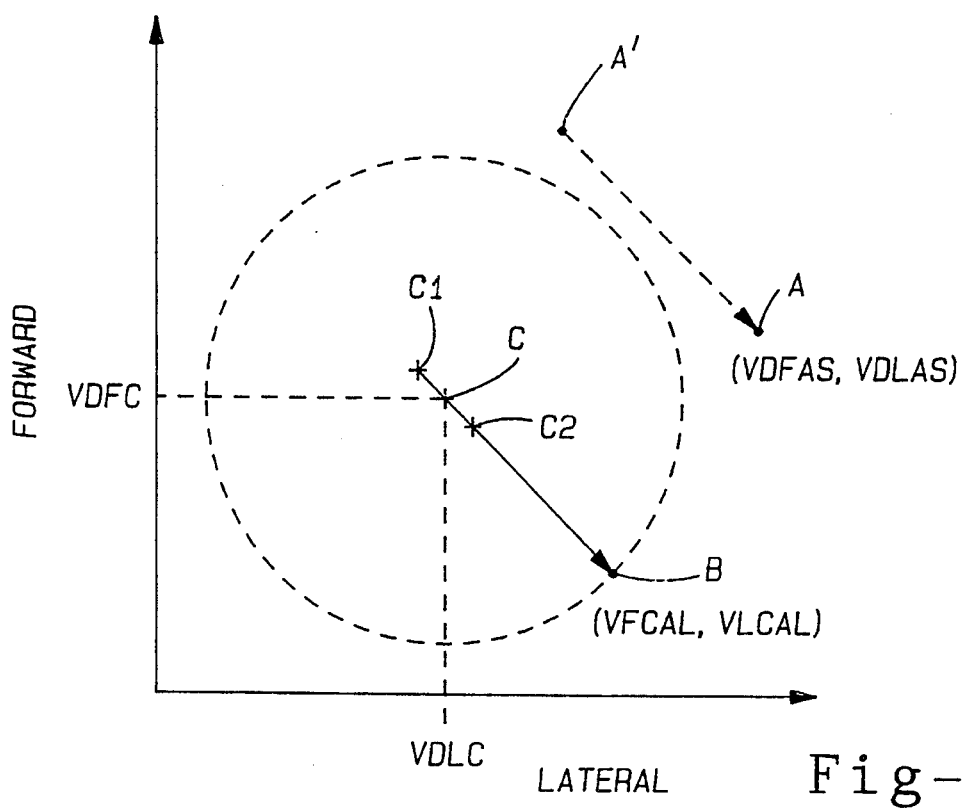
FIG. 9 is a vector diagram illustrating the operation of the factory calibration process of the present invention.
Figure 10:
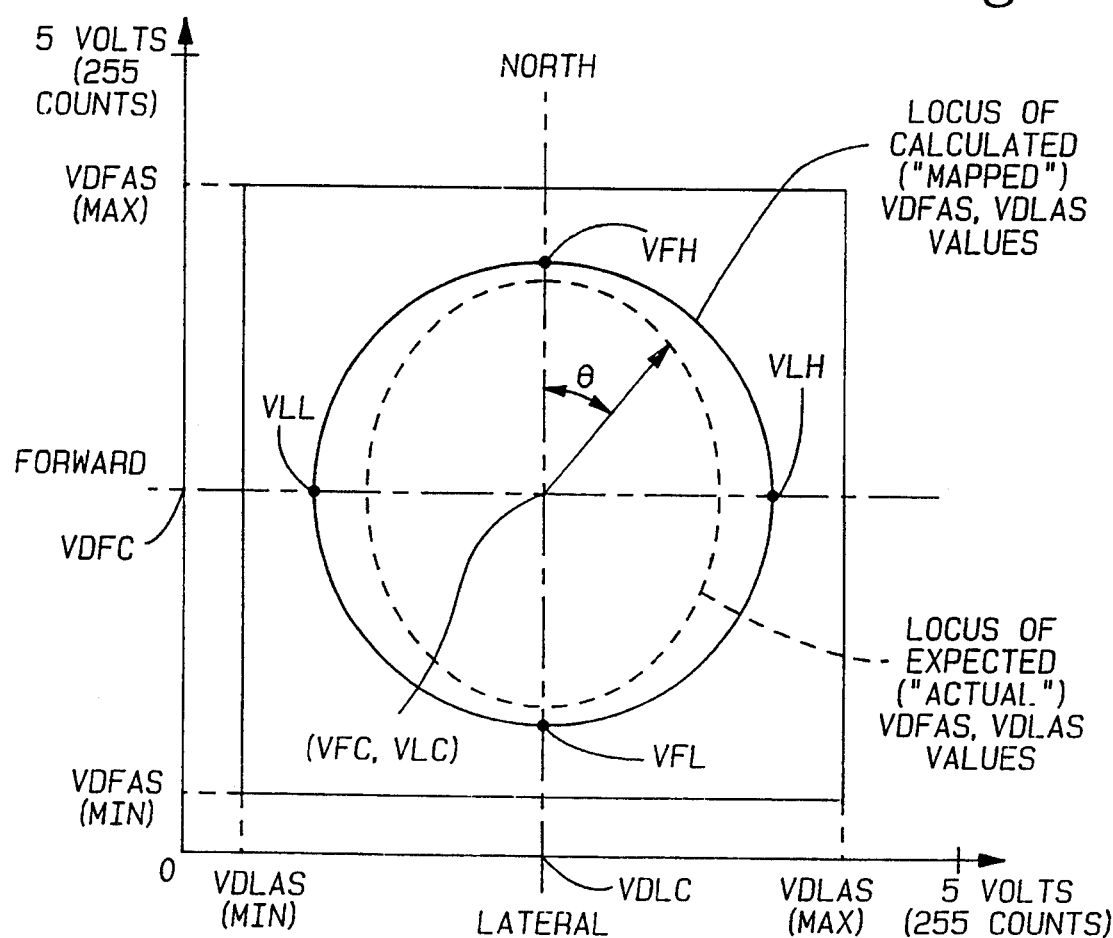
FIG. 10 is a vector diagram illustrating an exemplary locus of actual measured values and mapped computational values.

With additional reference to the vector diagrams in FIGS. 9 and 10, the function of the calibration routine process is to center the locus of measured values for VDFAS and VDLAS within the center of the dynamic operating range of the compass (i.e., at VDFC, VDLC). Present compass systems typically accomplish this by requiring that the vehicle be driven in a circle during the calibration mode so that the entire locus of VDFAS, VDLAS values can be measured and the center of the locus directly determined therefrom. It is then a simple procedure to move this calculated center to the center of the dynamic operating range of the compass by adjusting the compensation values supplied to the sensing coils. With the calibration scheme taught by the present invention, however, the compass can be calibrated without having to drive the vehicle in a complete circle.

Rather, the factory calibration process according to the present invention is able to accurately calibrate the compass based upon a comparison of a single heading measurement with prestored values corresponding to the desired heading measurement for the predetermined calibration location. In other words, the center of the locus of expected VDFAS, VDLAS values is determined from a single heading reading by determining the correct vector origin of the measured data point and then adjusting the compensation values to bring that vector origin to the center of the dynamic measuring range of the compass.

This is accomplished in the preferred embodiment in the following two-step manner. Initially, let us presume that the actual measured data values for VDFAS and VDLAS for the uncalibrated compass correspond to point A in FIG. 9. In addition, let us further assume that the desired magnetic heading reading at this calibration location corresponds to the values VFCAL and VLCAL which are prestored in the nonvolatile memory of the compass and correspond to data point B in the diagram. A straightforward approach to performing the calibration process would simply involve adjusting the compensation values NFC and NLC to bring the observed data point A into coincidence with the desired data point B. However, this approach assumes that by bringing data point A into coincidence with data point B also results in coincidence between the vector origin A' of vector A and the center point C. In fact, the vector origin A' of the vector A will only correspond to the center point C if the gain of the system is equal to the desired gain which may not be true. Consequently, by simply forcing point A to coincide with point B, the vector origin A' may in fact end up at point C1 or point C2 depending upon whether the actual gain of the system is greater than or less than the desired gain. Therefore, it is necessary to firstly determine the actual gain of the system and compare it to the design intent and adjust the values of VFCAL and VLCAL (i.e., data point B) accordingly to compensate for any differences between the actual gain and the desired gain of the system. Once this adjustment has been made, it is then possible to adjust the compensation values NFC and NLC to bring the data point A into coincidence with the adjusted data point B, thereby ensuring coincidence between the vector origin A' and the center point C. Note, however, for low resolution compass systems, it is sufficient to simply assume that the actual gain of the system is equivalent to the design intent, and thereby eliminate the need to make a separate gain measurement.

Figure 11:
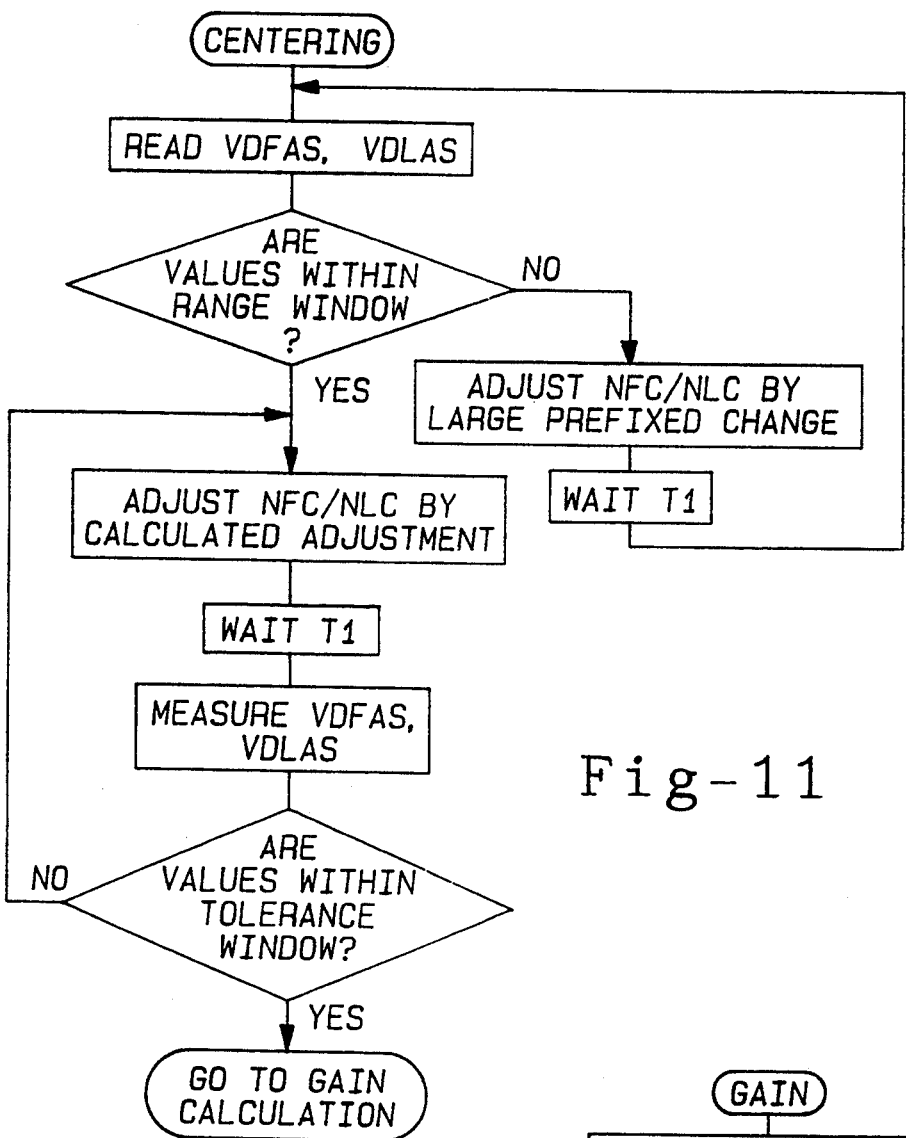
FIG. 11 is a flowchart diagram of the CENTERING algorithm referred to in FIG. 8.
Figure 12:
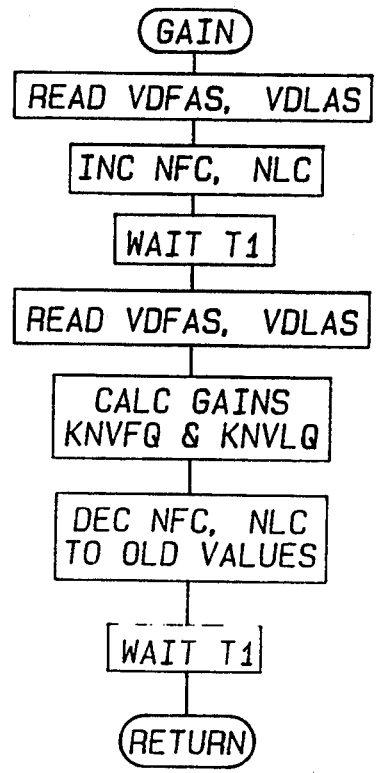
FIG. 12 is a flowchart diagram of the GAIN algorithm referred to in FIG. 8.

Returning to the flowchart diagrams in FIGS. 7 and 8, this procedure is accomplished in the present compass system in the following manner. Initially, the microcomputer 12 reads the appropriate values for VFCAL and VLCAL from the nonvolatile memory 60, depending upon whether the AUTO FACTORY or MANUAL FACTORY CALIBRATION flag is set. Next, the measured data point A is brought into coincidence with the center data point VDFC, VDLC by adjusting the compensation values NFC and NLC. The algorithm for accomplishing this centering technique is set forth in FIG. 11. Next, the microcomputer 12 is programmed to determine the actual gain of the system by making a known change to the compensation values NFC and NLC that will not saturate the readings of the compass and then measuring the resulting change in the values of VDFAS and VDLAS. Since the desired gain of the system should produce a known change, any variation from this expected change is the result of a variation from the design intent of the actual gain of the system. The actual gain of each channel, as calculated, is then stored in the nonvolatile EEPROM memory 60 of the system and referred to herein as KNVFQ and KNVLQ. The algorithm for performing this gain calculation is illustrated in FIG. 12.

With the actual gain of the system determined, the microcomputer 12 is able to calculate the desired values for VDFAS and VDLAS, based upon the values of VFCAL and VLCAL from the EEPROM and the measured gain values KNVFQ and KNVLQ. In other words, the target data point B is adjusted to a new "corrected" data point based upon the actual gain of the system. The microcomputer then makes a final adjustment in the compensation values NFC and NLC to bring the values of VDFAS and VDLAS into correspondence with the newly determined "corrected" data point B. The resulting compensation values for NFC and NLC are then stored in the nonvolatile memory 60 and used thereafter to produce the appropriate pulse width modulated compensation signals on output lines 38 and 40 which are supplied to the forward 14F and lateral 14L sensing coils of the compass. Lastly, new values for VFH, VFL, VLH, and VLL are calculated and stored in the compass's nonvolatile memory 60.

Returning to FIG. 7, when the program returns from the FACTORY CALIBRATION subroutine, the microcomputer confirms that the calibration process has been successful and then disables the AUTO FACTORY CALIBRATION mode so that an operator of the vehicle cannot inadvertently re-enable the FACTORY CALIBRATION mode once the vehicle has left the factory. As previously noted, if the present compass system is calibrated at the factory via the manual factory calibration mode, the only difference in the operation of the program is that different values for VFCAL and VLCAL are read from the nonvolatile memory 60.

Returning to the MAIN LOOP of the program, once the compass system has been calibrated, each time new data is received from the sensing coils 14F and 14L and determined to be valid, the AUTOCAL flag is set as previously described. The next pass through the MAIN LOOP, the program branches to the AUTOCAL routine. The AUTOCAL routine performs two primary functions. First, the AUTOCAL routine determines the new vehicle heading based upon the new data received from the VALID DATA routine. Secondly, the AUTOCAL routine performs a dynamic calibration process by updating the various compensation parameters for the system based upon the newly received data. More particularly, from the new values for VDFAS and VDLAS obtained from the VALID DATA routine, the AUTOCAL routine calculates the true vehicle heading based upon a mapped computation of the forward and lateral vectors and the gain factors KNVFQ and KNVLQ. In addition, the calculated heading vector is then compared to the closest north, south, east, or west vector (i.e., VFH, VFL, VLH, or VLL) and any resulting difference used to update the value of the closest main heading vector VFH, VFL, VLH, or VLL (FIG. 10). In the preferred embodiment, a logarithmic time-weighted average calculation is used to calculate the new value of VFH, VFL, VLH, or VLL. In addition, new values for VFC and VLC are also calculated (i.e., a new center is determined), but the values of the compensation coefficients NFC and NLC are not changed unless the excursion of VFC and VLC takes the newly calculated center outside of a predefined "acceptable" window of variation.

Figure 13:
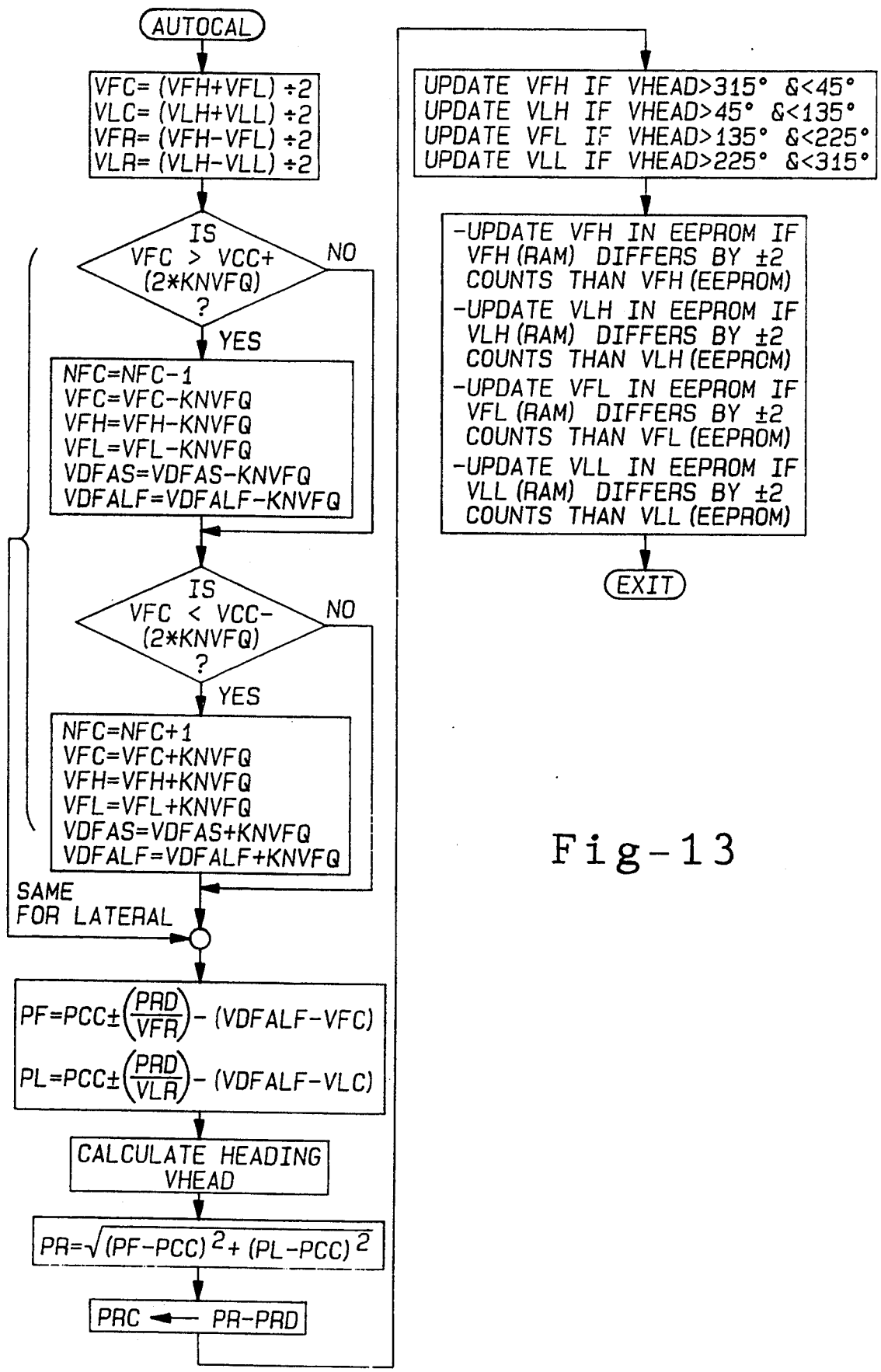
FIG. 13 is a flowchart diagram of the automatic dynamic calibration or AUTOCAL routine.

Turning to the flowchart diagram of the AUTOCAL routine shown in FIG. 13, the AUTOCAL routine initially calculates the mapped radius and mapped center based upon the most recently updated values for VFH, VFL, VLH, and VLL. The program then determines if the mapped center is within the allowable "window", designated 90 in FIG. 10. If the mapped center is outside the allowable window, the values of NFC and NLC are either incremented or decremented accordingly in an attempt to move the mapped center back within the window.

Importantly, it will be noted that when an adjustment is made to the value of either NFC or NLC, the microcomputer is programmed to also immediately update the appropriate stored values defining the calculated or mapped VDFAS, VDLAS values. In other words, since a change in the value of either NFC or NLC shifts the position of the locus of mapped VDFAS, VDLAS values, the stored values for VFC, VFH, and VFL, or VLC, VLH, and VLL, respectively, also need to be updated. Moreover, because the actual gain of the system (KNVFQ, KNVLQ) is known, having previously been calculated in the GAIN subroutine (FIG. 12), the microcomputer is able to immediately calculate new values for VFC, VFH, and VFL, and/or VLC, VLH, and VLL based upon the change(s) made in the value(s) of NFC and/or NLC, respectively, without having to wait for the receipt of an entire new locus set of VDFAS, VDLAS values.

Next, the AUTOCAL routine calculates the mapped forward vector and the mapped lateral vector based upon the newly obtained data values for VDFAS and VDLAS. The new heading vector is then calculated based upon the mapped forward and mapped lateral vectors PF and PL. In the preferred embodiment, the updated heading display is actually computed as the logarithmic average of the newly calculated heading vector and the previous heading display, using the formula:

$$VHEAD_{(n+1)} = \alpha * VHEAD_{(new)} + (1-\alpha) * VHEAD_n \text{ where } \alpha = 0.1$$

The mapped radius of the newly calculated heading vector is then computed and, if negative, a sign flag is set. The resulting heading vector is then compared to the closest main heading vector VFH, VLH, VFL, or VLL and the difference used to update the value of the closest main vector using the same logarithmic average formula, namely:

$$VFH_{(n+1)} = \alpha * VHEAD_{(new)} + (1-\alpha) * VFH_n$$
where a-0.1

If the updated value for VFH, VLH, VFL, or VLL differs by more than two counts from the corresponding value stored in the nonvolatile memory 60, then the updated value is read into the EEPROM. The program then returns to the MAIN LOOP.

Figure 14:
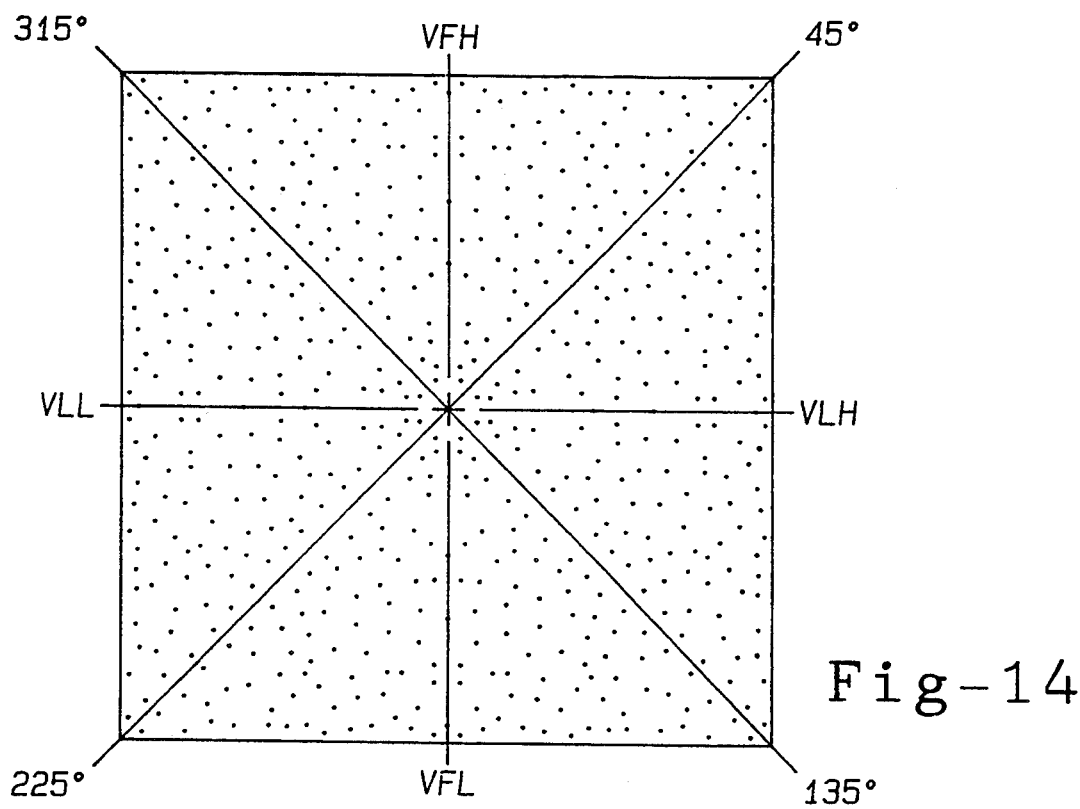
FIG. 14 is a graph illustrating the preferred procedure for updating the four main heading vectors in the AUTOCAL routine.
Figure 15:
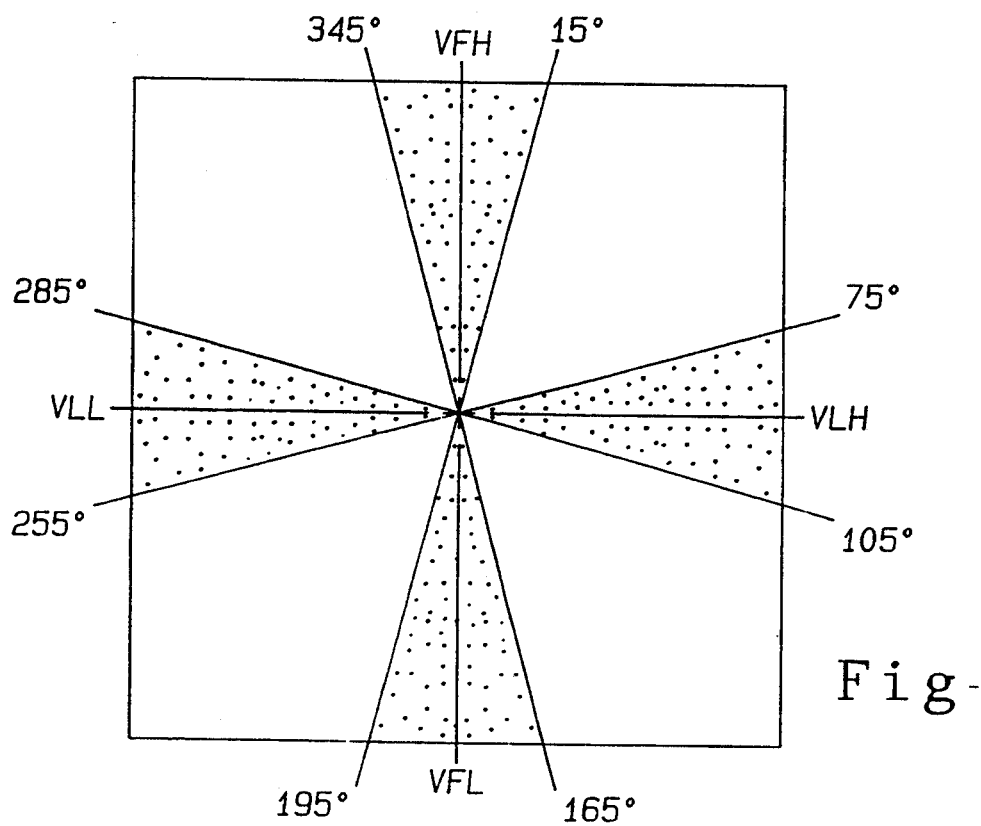
FIG. 15 is a graph illustrating an alternative approach to updating the four main vector headings in the AUTOCAL subroutine.

As illustrated in FIG. 14 in the presently described embodiment, the value of vector VFH is updated if the newly calculated heading vector falls between 315° and 45°. Similarly, the value for VLH is updated if the newly calculated heading vector falls between 45° and 135°, and so on. Alternatively, however, it may be desirable to update the values for VFH, VLH, VFL, and VLL only when the newly calculated heading vector falls within ±15° of these main headings, as illustrated in FIG. 15. In this embodiment, the values for VFH, VFL, VLH, and VLL are updated somewhat less frequently than the previously described embodiment; however, the data used to update these values is somewhat more accurate. In addition, because new values for VFH, VFL, VLH, and VLL are written less frequently into the nonvolatile memory unit 60 of the compass, the life expectancy of the EEPROM is increased with the alternative embodiment of FIG. 15.

Finally, it will be noted that the preferred embodiment of the present compass system additionally includes a manual calibration mode that enables an operator to manually recalibrate the compass system in the event it goes out of calibration beyond the adaptive ability of the AUTOCAL routine to compensate for. This may occur, for example, if the vehicle has been damaged in an accident, or the compass module has been replaced for whatever reason. The manual calibration technique employed in the preferred embodiment follows the general technique described in the Background of the Invention wherein the manual calibration routine is entered by depressing a unique button sequence on the display and then the vehicle is driven around in a series of circles until the calibration light on the display goes out. As the vehicle is driven in a circle, the maximum and minimum readings from the forward and lateral sensing coils (i.e., VFH, VFL, VLH, and VLL) are obtained and the center of the locus of the observed values calculated therefrom. The values of NFC and NLC are then adjusted to move the center to the true center (i.e., VDFC, VDLC) of the dynamic measuring range of the compass. If, however, the initial locus of sensor readings results in excursions outside the dynamic range of the compass, the values of NFC and NLC are preliminarily adjusted to move the locus of readings entirely within the dynamic range of the compass. New readings are then obtained as the vehicle continues to be driven in a circle and then the final adjustments to the values of NFC and NLC are made as described above. The same CENTER and GAIN subroutines used in the FACTORY CALIBRATION routine are also employed in the MANUAL CALIBRATION routine.

Following is a table setting forth the definitions of the various abbreviated designations used in the flowchart diagrams discussed above:

| DEFINITIONS: | |
| --- | --- |
| VFCAL | Desired Forward Coil Reading for Factory Calibration (from EEPROM) |
| VLCAL | Desired Lateral Coil Reading for Factory Calibration (from EEPROM) |
| VDFAS | Actual Forward Coil Reading (from A/D) - short average |
| VDLAS | Actual Lateral Coil Reading (from A/D) - short average |
| VDFALF | Actual Forward Coil Reading (from A/D) - long average |
| VDLALF | Actual Lateral Coil Reading (from A/D) - long average |
| NFC | Forward Coil Compensation Parameter |
| NLC | Lateral Coil Compensation Parameter |
| VFC | Value of Forward Coil at the Measured Center of the Locus of VDFAS/VDLAS Values |
| VLC | Value of Lateral Coil at the Measured Center of the Locus of VDFAS/VDLAS Values |
| VFH | North Heading Vector (Calculated) |
| VFL | South Heading Vector (Calculated) |

-continued

| DEFINITIONS: | |
|---|---|
| VLH | East Heading Vector (Calculated) |
| VLL | West Heading Vector (Calculated) |
| KNVFQ | Control Gain of Circuit in Forward Channel $= \frac{\Delta V(A/D)}{\Delta NFC}$ |
| KNVLQ | Control Gain of Circuit in Lateral Channel $= \frac{\Delta V(A/D)}{}$ |
| VFR | Value of the Measured Forward Radius Vector |
| VLR | Value of the Measured Lateral Radius Vector |
| VCC | Tolerance Window for Mapped Center |
| PF | Mapped Forward Vector |
| PL | Mapped Lateral Vector |
| PCC | Mapped Center |
| PRD | Mapped Desired Radius |
| PR | Magnitude of Mapped Radius |

While the above description constitutes the preferred embodiment of the invention, it will be appreciated that the invention is susceptible to modification, variation, and change without departing from the proper scope or fair meaning of the accompanying claims.

What is claimed is:

1. A vehicle compass system comprising magnetic sensing means including a magnetic sensing device having first and second sensing coils positioned within the vehicle and adapted for producing first and second output signals that vary in accordance with changes in the directional heading of the vehicle, a control circuit including a microcomputer for producing first and second compensation signals that are supplied to said first and second sensing coils, respectively, to compensate for the remnant magnetic fields associated with the vehicle and for processing said first and second output signals from said magnetic sensing means and determining therefrom the heading direction of the vehicle and producing display output signals that are supplied to a display means adapted to display the heading direction of the vehicle; the improvement comprising: memory means for storing predetermined values corresponding to the desired values for said first and second output signals when the vehicle is positioned in a single predetermined location and orientation; initiation means for initiating an initial calibration process when the vehicle is in said predetermined location and orientation; and wherein said microcomputer is programmed to be responsive to said initiation means for initially calibrating the compass system by reading said desired values from said memory means and generating appropriate compensation signals for both said first and second sensing coils to cause the actual output signals from said magnetic sensing means to bear a determined relationship to said desired values, and storing the values of said appropriate compensation signals.

2. The vehicle compass system of claim 1 wherein said initiation means comprises manually actuable switch means associated with said display means for producing a calibration signal that is supplied to said microcomputer.

3. The vehicle compass system of claim 2 wherein said desired values for said first and second output signals stored in said memory means correspond to the vehicle heading at a predetermined relatively magnetically stable location in the assembly plant where the vehicle is assembled.

4. The vehicle compass system of claim 1 wherein said initiation means is responsive to the occurrence of a uniquely definable event which happens during the final assembly of the vehicle at a defined location on the assembly line where the vehicle is assembled.

5. The vehicle compass system of claim 4 wherein said uniquely definable event comprises the initial start-up of the vehicle engine and engagement of the vehicle transmission, and said initiation means includes means for detecting an operating condition related to the speed of the vehicle.

6. The vehicle compass system of claim 4 wherein said desired values for said first and second output signals stored in said memory means correspond to the vehicle heading at said defined location on the assembly line.

7. The vehicle compass system of claim 1 wherein said microcomputer is further programmed to store in said memory means the values of said appropriate compensation signals.

8. A vehicle compass system comprising a magnetic sensing device having first and second sensing coils positioned within the vehicle and adapted for producing output signals that vary in accordance with changes in the directional heading of the vehicle, a control circuit including signal processing means having associated therewith a gain factor for processing the output signals from the sensing coils and producing corresponding actual sensor signals, a microcomputer for producing compensation signals that are supplied to said sensing coils to compensate for the remnant magnetic fields associated with the vehicle, for determining from said actual sensor signals the directional heading of the vehicle, and for producing display output signals that are supplied to a display means adapted to display the directional heading of the vehicle; the improvement comprising: memory means for storing a predetermined value corresponding to the desired value for at least one of said actual sensor signals when the vehicle is oriented in a predetermined position; initiation means for initiating an initial calibration process when the vehicle is oriented in said predetermined position; and wherein said microcomputer is programmed to be responsive to said initiation means for initially calibrating the compass system by reading said desired sensor signal value, determining the actual gain factor of said signal processing means, adjusting the value of said desired sensor signal value in accordance with the difference between said actual gain factor and a predetermined gain factor, generating an appropriate compensation signal to cause said one actual sensor signal to correspond to said adjusted desired sensor signal, and storing in said memory means said determined actual gain factor.

9. The vehicle compass system of claim 8 wherein said microcomputer is programmed to determine said actual gain factor by making a predetermined change in the value of said compensation signal and determining the magnitude of the resulting change in the value of said one actual sensor signal caused thereby.

10. A method of initially calibrating a vehicle compass system comprising a magnetic sensing device having first and second sensing coils positioned within the vehicle and adapted for producing output signals that vary in accordance with changes in the directional heading of the vehicle, a control circuit including signal processing means for processing the output signals from the sensing coils and producing corresponding actual sensor signals, memory means, and a microcomputer for producing first and second compensation signals that are supplied to said first and second sensing coils respectively to compensate for the remnant magnetic fields associated with the vehicle and for determining from said actual sensor signals the heading direction of the vehicle and producing display output signals that are supplied to a display means adapted to display the heading direction of the vehicle; the method comprising the steps of:

selecting a relatively magnetically stable location along the final portion of the assembly line where the vehicle is assembled;

storing in said memory means predetermined values corresponding to the desired values for said actual sensor signals when the vehicle is located at said selected location; and initiating an initial calibration process when the vehicle reaches said selected location, said initial calibration process comprising the further steps of obtaining the actual sensor signals for both of said first and second sensing coils, comparing said actual sensor signals to said desired values, and adjusting the values of both of said compensation signals until said actual sensor signals bear a determinable relationship to said desired values.

11. The method of claim 10 wherein said signal processing means has associated therewith an actual gain factor, and wherein said adjusting step includes the steps of determining said actual gain factor of said signal processing means, adjusting said desired values in accordance with the difference between said actual gain factor and a predetermined gain factor, and generating appropriate compensation signals for both of said first and second sensing coils to cause said actual sensor signals to correspond to said adjusted desired values.

12. The method of claim 11 wherein said step of determining said actual gain factor includes the steps of making a predetermined change in the values of said compensation signals, and determining the magnitude of the resulting changes to the values of said actual sensor signals caused thereby.

13. The method of claim 10 wherein said initiating step comprises detecting the occurrence of a uniquely definable event which happens during the final assembly of the vehicle and automatically initiating said calibration process in response thereto.

14. The method of claim 13 wherein said uniquely definable event comprises the initial start-up of the vehicle engine.

15. A method of dynamically calibrating a vehicle compass system during normal operation of the vehicle in which the compass system is installed wherein the compass system comprises a magnetic sensing device having first and second sensing coils positioned within the vehicle and adapted for producing output signals that vary in accordance with changes in the directional heading of the vehicle, a control circuit including memory means and a microcomputer for producing first and second compensation signals that are supplied to said first and second sensing coils respectively to compensate for the remnant magnetic fields associated with the vehicle and for processing the output signals from the sensing coils and determining therefrom the heading direction of the vehicle and producing display output signals that are supplied to a display means adapted to display the heading direction of the vehicle; the method comprising the steps of:

establishing desired heading data corresponding to each of the N, S, E, W main heading directions;

obtaining new output signals from said sensing coils sufficient to determine the current heading direction of the vehicle;

processing said new output signals and determining therefrom new heading data representative of the current heading direction of the vehicle;

producing new display output signals in accordance with said new heading data and displaying the current heading direction on said display means; and determining from said new heading data whether to change the value of either of said first and second compensation signals by comparing said new heading data with said desired main heading data for the main heading direction closest to said current heading direction and updating the closest of said desired main heading data based upon said comparison.

16. The method of claim 15 wherein said comparing and updating steps are performed only when said current heading direction is within a predetermined number of degrees of a main heading direction.

17. The method of claim 16 wherein said predetermined number is 15 degrees.

18. The method of claim 15 further including the step of establishing desired center data corresponding to the center of said desired heading data for said main heading directions, and wherein said determining step further includes the steps of calculating new center data based upon said updated main desired heading data and changing the values of said first and second compensation signals based upon a comparison of said new center data with said desired center data.

19. The method of claim 18 wherein the values of said first and second compensation signals are changed when said new center data differs from said desired center data by more than a predetermined amount.

20. The method of claim 18 further including the step of calculating updated desired heading data for said main heading directions whenever the value of either of said first and second compensation signals is changed.

21. The method of claim 20 wherein the circuitry for processing said sensor output signals has associated therewith a gain factor and further wherein said step of calculating updated desired heading data for said main heading directions is based upon said gain factor.

22. A vehicle compass system comprising magnetic sensing means including a magnetic sensing device having first and second sensing coils positioned within the vehicle and adapted for producing first and second output signals that vary in accordance with changes in the directional heading of the vehicle, a control circuit including a microcomputer for processing said first and second output signals from said magnetic sensing means and determining therefrom the heading direction of the vehicle and producing display output signals that are supplied to a display means adapted to display the heading direction of the vehicle; the improvement comprising: memory means for storing predetermined values corresponding to the desired values for said first and second output signals when the vehicle is positioned in a single predetermined location and orientation; initiation means for initiating an initial calibration process when the vehicle is in said predetermined location and orientation; and wherein said microcomputer is programmed to be responsive to said initiation means for initially calibrating the compass system by reading said desired values from said memory means, determining the differences between said desired values and said first and second output signals from said magnetic sensing means when the vehicle is positioned in said predetermined location and orientation, and using said differences to correct said display output signals.

23. The vehicle compass system of claim 22 wherein said initiation means comprises manually actuable switch means associated with said display means for producing a calibration signal that is supplied to said microcomputer.

24. The vehicle compass system of claim 23 wherein said desired values for said first and second output signals stored in said memory means correspond to the vehicle heading at a predetermined relatively magnetically stable location in the assembly plant where the vehicle is assembled.

25. The vehicle compass system of claim 22 wherein said initiation means is responsive to the occurrence of a uniquely definable event which happens during the final assembly of the vehicle at a defined location on the assembly line where the vehicle is assembled.

26. The vehicle compass system of claim 25 wherein said uniquely definable event comprises the initial start-up of the vehicle engine and engagement of the vehicle transmission, and said initiation means includes means for detecting an operating condition related to the speed of the vehicle.

27. The vehicle compass system of claim 25 wherein said desired values for said first and second output signals stored in said memory means correspond to the vehicle heading at said defined location on the assembly line.

28. The vehicle compass system of claim 22 wherein said microcomputer is further programmed to store said differences in said memory means.

29. A method of initially calibrating a vehicle compass system comprising a magnetic sensing device having first and second sensing coils positioned within the vehicle and adapted for producing output signals that vary in accordance with changes in the directional heading of the vehicle, a control circuit including signal processing means for processing the output signals from the sensing coils and producing corresponding actual sensor signals, memory means, and a microcomputer for determining from said actual sensor signals the heading direction of the vehicle and producing display output signals that are supplied to a display means adapted to display the heading direction of the vehicle; the method comprising the steps of:
selecting a relatively magnetically stable location along the final portion of the assembly line where the vehicle is assembled;
storing in said memory means predetermined values corresponding to the desired values for said actual sensor signals when the vehicle is located at said selected location; and
initiating an initial calibration process when the vehicle reaches said selected location, said initial calibration process comprising the further steps of obtaining the actual sensor signals for both of said first and second sensing coils, comparing said actual sensor signals to said desired values, and correcting said display output signals in accordance with the differences between said actual sensor signals and said desired values.

30. The method of claim 29 wherein said signal processing means has associated therewith an actual gain factor, and wherein said correcting step includes the steps of determining said actual gain factor of said signal processing means, adjusting said desired values in accordance with the difference between said actual gain factor and a predetermined gain factor, and correcting said display output signals in accordance with the differences between said actual sensor signals and said adjusted desired values.

31. The method of claim 29 wherein said initiating step comprises detecting the occurrence of a uniquely definable event which happens during the final assembly of the vehicle and automatically initiating said calibration process in response thereto.

32. The method of claim 31 wherein said uniquely definable event comprises the initial start-up of the vehicle engine.

33. A method of dynamically calibrating a vehicle compass system during normal operation of the vehicle in which the compass system is installed wherein the compass system comprises a magnetic sensing device having first and second sensing coils positioned within the vehicle and adapted for producing output signals that vary in accordance with changes in the directional heading of the vehicle, a control circuit including memory means and a microcomputer for determining the appropriate compensation factors to compensate for the remnant magnetic fields associated with the vehicle, processing the output signals from the sensing coils, and determining therefrom the heading direction of the vehicle and producing display output signals that are supplied to a display means adapted to display the heading direction of the vehicle; the method comprising the steps of:
establishing desired heading data corresponding to each of the N, S, E, W main heading directions;
obtaining new output signals from said sensing coils sufficient to determine the current heading direction of the vehicle;
processing said new output signals and determining therefrom new heading data representative of the current heading direction of the vehicle;
producing new display output signals in accordance with said new heading data and displaying the current heading direction on said display means; and
determining from said new heading data whether to change the value of said compensation factors by comparing said new heading data with said desired main heading data for the main heading direction closest to said current heading direction and updating the closest of said desired main heading data based upon said comparison.

34. The method of claim 33 wherein said comparing and updating steps are performed only when said current heading direction is within a predetermined number of degrees of a main heading direction.

35. The method of claim 33 further including the step of establishing desired center data corresponding to the center of said desired heading data for said main heading directions, and wherein said determining step further includes the steps of calculating new center data based upon said updated main desired heading data and changing said compensation factors based upon a comparison of said new center data with said desired center data.

36. The method of claim 35 wherein said compensation factors are changed when said new center data differs from said desired center data by more than a predetermined amount.

37. The method of claim 35 further including the step of calculating updated desired heading data for said main heading directions whenever said compensation factors are changed.

38. The method of claim 37 wherein the circuitry for processing said sensor output signals has associated therewith a gain factor and further wherein said step of calculating updated desired heading data for said main heading directions is based upon said gain factor.

* * * * *